United States Patent
Iwata et al.

(10) Patent No.: US 9,657,681 B2
(45) Date of Patent: May 23, 2017

(54) ENGINE CONTROL DEVICE

(71) Applicants: Kazuyasu Iwata, Fuji (JP); Akira Yamashita, Mishima (JP)

(72) Inventors: Kazuyasu Iwata, Fuji (JP); Akira Yamashita, Mishima (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/896,772

(22) PCT Filed: Jun. 10, 2013

(86) PCT No.: PCT/JP2013/065925
§ 371 (c)(1),
(2) Date: Dec. 8, 2015

(87) PCT Pub. No.: WO2014/199425
PCT Pub. Date: Dec. 18, 2014

(65) Prior Publication Data
US 2016/0123269 A1    May 5, 2016

(51) Int. Cl.
*B60T 7/12* (2006.01)
*F02D 41/40* (2006.01)
(Continued)

(52) U.S. Cl.
CPC ........... *F02D 41/401* (2013.01); *F02D 23/02* (2013.01); *F02D 35/025* (2013.01);
(Continued)

(58) Field of Classification Search
CPC ..... F02D 2001/0085; F02D 2200/0618; F02D 19/081; F02D 41/0085; F02M 41/123
(Continued)

(56) References Cited

U.S. PATENT DOCUMENTS 5,698,776 A    12/1997 Tomisawa
2005/0274352 A1    12/2005 Canale et al.
(Continued)

FOREIGN PATENT DOCUMENTS

EP    2 375 034 A2    12/2011
JP    01-216055 A    8/1989
(Continued)

OTHER PUBLICATIONS

Office Action issued in U.S. Appl. No. 14/896,292 on Sep. 22, 2016.

*Primary Examiner* — John Kwon
(74) *Attorney, Agent, or Firm* — Finnegan, Henderson, Farabow, Garrett & Dunner, LLP

(57) ABSTRACT

A control device for an engine provided with a turbocharger properly uses a parameter used for controlling a center-of-gravity position of a heat generation rate determined by a heat generation rate as the amount per unit crank angle of heat generated by combustion of fuel depending on operating situations of the engine and a vehicle in which the engine is mounted. Specifically, an increase in a turbocharging pressure of the turbocharger is executed when a rotational speed of the engine and a speed of the vehicle in which the engine is mounted are lower than predetermined reference values in a case where the center-of-gravity position of a heat generation rate is further on a retard side than a predetermined crank angle and one or both of an increase in a fuel injection pressure and advancing of a fuel injection timing are executed when the rotational speed of the engine or the speed of the vehicle in which the engine is mounted are equal to or higher than the predetermined reference values in the case where the center-of-gravity position of a heat generation rate is further on the retard side than the predetermined crank angle. Then, fuel economy can be improved by the center-of-gravity position of a heat generation rate being maintained at a predetermined fixed value regardless of a load of the engine and/or the engine rotational speed while an increase in noise and vibration a user feels uncomfortable with is suppressed.

10 Claims, 9 Drawing Sheets

(51) Int. Cl.
*F02D 35/02* (2006.01)
*F02D 41/00* (2006.01)
*F02D 23/02* (2006.01)
*F02D 41/10* (2006.01)
*F02D 41/14* (2006.01)
*F02D 41/26* (2006.01)
*F02D 41/38* (2006.01)
*F02D 21/08* (2006.01)

(52) U.S. Cl.
CPC ....... *F02D 41/0007* (2013.01); *F02D 41/107* (2013.01); *F02D 41/1444* (2013.01); *F02D 41/26* (2013.01); *F02D 41/3863* (2013.01); *F02D 2021/083* (2013.01); *F02D 2200/501* (2013.01); *Y02T 10/144* (2013.01)

(58) Field of Classification Search
USPC ................ 701/101–105, 110, 114, 115; 123/406.26, 406.3, 406.41, 406.42, 434, 123/435, 673–679
See application file for complete search history.

(56) References Cited

U.S. PATENT DOCUMENTS

| | | | |
|---|---|---|---|
| 2012/0046850 A1* | 2/2012 | Yasuda | F02D 35/024 701/102 |
| 2012/0053819 A1 | 3/2012 | Yasuda et al. | |
| 2016/0115888 A1* | 4/2016 | Yamashita | F02D 35/023 701/104 |
| 2016/0115890 A1* | 4/2016 | Oyagi | F02D 35/023 60/284 |
| 2016/0123264 A1* | 5/2016 | Oyagi | F02D 35/023 701/105 |

FOREIGN PATENT DOCUMENTS

| | | |
|---|---|---|
| JP | 02-005710 A | 1/1990 |
| JP | 06-010673 A | 1/1994 |
| JP | 8-232820 | 9/1996 |
| JP | 2003-500596 | 1/2003 |
| JP | 2003-239795 A | 8/2003 |
| JP | 2004-197716 | 7/2004 |
| JP | 2005-054753 A | 3/2005 |
| JP | 2007-285194 A | 11/2007 |
| JP | 2008-25406 | 2/2008 |
| JP | 2009-209943 | 9/2009 |
| JP | 2010-236534 | 10/2010 |
| JP | 2011-202629 | 10/2011 |
| JP | 2011-220186 A | 11/2011 |
| JP | 2015-113790 A | 6/2015 |
| WO | WO99/42718 A1 | 6/1999 |
| WO | WO2015/088034 A1 | 6/2015 |

* cited by examiner

# ENGINE CONTROL DEVICE

CROSS-REFERENCE TO RELATED APPLICATIONS

This application is a national phase application of International Application No. PCT/JP2013/065925, filed Jun. 10, 2013, the content of which is incorporated herein by reference.

TECHNICAL FIELD

The invention relates to an engine control device that controls a combustion state of fuel in an internal combustion engine. More specifically, the invention relates to an engine control device that is capable of controlling a combustion state of fuel in an internal combustion engine and reducing noise and vibration resulting from the control.

BACKGROUND ART

In general, some of the energy that results from fuel combustion when an internal combustion engine (hereinafter, simply referred to as an "engine" in some cases) such as a diesel engine is in operation is converted into work rotating a crankshaft while the rest of the energy becomes loss. This loss includes cooling loss that is lost as heat generated in an engine main body, exhaust loss that is released to the atmosphere by exhaust gas, pump loss that results from air intake and exhaust, and mechanical resistance loss. The cooling loss and the exhaust loss account for large portions of the entire loss. Accordingly, it is effective to decrease the cooling loss and the exhaust loss when the fuel economy of the internal combustion engine is to be improved.

However, the cooling loss and the exhaust loss have a trade-off relationship in general. In other words, the exhaust loss increases when the cooling loss decreases, and the cooling loss increases when the exhaust loss decreases. Accordingly, the fuel economy of the engine is improved when a combustion state where the sum of the cooling loss and the exhaust loss decreases can realized.

The combustion state of the fuel (air-fuel mixture) in the engine changes depending on "many parameters affecting the combustion state" such as a fuel injection timing and a turbocharging pressure. Hereinafter, the parameter affecting the combustion state will be simply referred to as a "combustion parameter" in some cases. It is difficult and takes a significant period of adaptation time to have values (combinations) suitable for various operation states obtained in advance by an experiment, simulation, or the like with regard to a plurality of the combustion parameters. Accordingly, methods for systematically determining combustion parameters have been developed.

For example, a control device according to the related art (hereinafter, also referred to as a "conventional device") calculates a "crank angle at a point in time when half of the total amount of heat resulting during a single combustion stroke is generated (hereinafter, referred to as the "angle of the combustion center of gravity")". In a case where the angle of the combustion center of gravity and a predetermined reference value deviate from each other, the conventional device causes the angle of the combustion center of gravity to correspond to the reference value by correcting the fuel injection timing or adjusting the oxygen concentration in a combustion chamber (cylinder) based on EGR ratio adjustment (for example, refer to PTL 1).

CITATION LIST

Patent Literature

PTL 1: Japanese Patent Application Publication No. 2011-202629

SUMMARY OF THE INVENTION

In the diesel engine, for example, a multi-stage injection is performed in some cases so that the fuel is injected a plurality of times during one cycle of combustion. More specifically, in the diesel engine, a pilot injection is performed prior to a main injection and then the main injection is performed in some cases. In some cases, an after-injection is performed after the main injection.

A relationship between the crank angle and a heat generation rate pertaining to a case where the pilot injection and the main injection are performed is expressed as, for example, the waveform that is illustrated by a curve C1 in FIG. 7A. The heat generation rate is the amount per unit crank angle (unit amount of change in the rotational position of a crankshaft) of heat generated by the combustion of the air-fuel mixture, that is, the amount of heat generation per unit crank angle. This waveform will also be referred to as a "combustion waveform" below. The waveform that is illustrated in FIG. 7A is allowed to reach a maximum value Lp by the pilot injection which is initiated at a crank angle $\theta1$ and reach a maximum value Lm by the main injection which is initiated at a crank angle $\theta2$.

FIG. 7B illustrates a relationship between the crank angle and the "ratio of an integrated value of the amount of the heat generated by the combustion illustrated by the curve C1 to the total amount of the generated heat (heating value ratio)". In the example that is illustrated in FIG. 7B, the angle of the combustion center of gravity described above (crank angle at which the heating value ratio is 50%) is a crank angle $\theta3$.

In a case where only the timing of the initiation of the pilot injection is moved to an advance side by $\Delta\theta$ ($=\theta1-\theta0$) from the crank angle $\theta1$ to a crank angle $\theta0$ as illustrated by a solid line C2 in FIG. 8A, the crank angle at which the heat begins to be generated by the combustion of the fuel of the pilot injection is moved to the advance side by a crank angle $\Delta\theta$. During the combustion that is illustrated in FIGS. 7A and 8A, however, the angle of the combustion center of gravity is past the initiation of the combustion of the fuel of the main injection (past the crank angle $\theta2$), and thus the angle of the combustion center of gravity remains unchanged at the crank angle $\theta3$ as is apparent from FIG. 8B illustrating the heating value ratio of the combustion illustrated by the curve C2. In other words, the angle of the combustion center of gravity does not change in some cases even when the combustion waveform is changed by a movement of the pilot injection timing to the advance side. In other words, the angle of the combustion center of gravity is not necessarily an index value that accurately reflects the combustion state of each cycle.

The inventor actually measured a "relationship between the angle of the combustion center of gravity and a fuel economy deterioration rate" with regard to various combinations of "engine loads (required torques) and engine rotational speeds". The results of the measurement are illustrated in FIG. 9. Curves Hb1 to Hb3 in FIG. 9 show the measurement results pertaining to the case of a low rotational speed and a low load, the case of a medium rotational speed and a medium load, and the case of a high rotational speed and a high load, respectively. The inventor has found that the angle of the combustion center of gravity at which the fuel economy deterioration rate is minimized (angle of the combustion center of gravity of ideal fuel economy) varies at different loads and/or rotational speeds of the engine as shown in FIG. 9. In other words, the inventor has found that the fuel economy deterioration rate is not necessarily minimized, even when the combustion state is controlled so that the angle of the combustion center of gravity corresponds to a constant reference value, when the load and/or the rotational speed of the engine varies.

The inventor focused on the "center-of-gravity position of a heat generation rate", instead of the angle of the combustion center of gravity according to the related art, as an index value representing the combustion state. The center-of-gravity position of a heat generation rate is determined by a heat generation rate as the amount per unit crank angle of heat generated by the combustion of fuel and is expressed as the rotational position of a crankshaft (that is, crank angle). Although the definition of the center-of-gravity position of a heat generation rate will be described in detail later, it can be said that the center-of-gravity position of a heat generation rate is an index value more accurately reflecting the combustion state than the angle of the combustion center of gravity as a combustion state index value of the related art. In other words, the inventor has found that the combustion state of the engine can be maintained in a specific state and fuel economy can be improved when the center-of-gravity position of a heat generation rate is maintained at a predetermined fixed value regardless of the engine load and/or the engine rotational speed. In this regard, the inventor has given a thought to an engine control device that maintains the center-of-gravity position of a heat generation rate at a fixed crank angle regardless of the engine load and/or the engine rotational speed.

As described above, the combustion state of the fuel (air-fuel mixture) in the engine changes depending on the many combustion parameters including the fuel injection timing and the turbocharging pressure. Accordingly, the center-of-gravity position of a heat generation rate described above also changes depending on the combustion parameters including the fuel injection timing, a fuel injection pressure, the amount of the fuel injected by the pilot injection, and the turbocharging pressure. In other words, in a case where the combustion state of the engine is to be maintained in a specific state for fuel economy improvement with the center-of-gravity position of a heat generation rate being maintained at a predetermined fixed value regardless of the engine load and/or the engine rotational speed as described above, the combustion parameters including the fuel injection timing, the fuel injection pressure, the amount of the fuel injected by the pilot injection, and the turbocharging pressure can be used as parameters that control the center-of-gravity position of a heat generation rate. Parameters relating to fuel injection such as the fuel injection timing and the fuel injection pressure (injection system parameters) among these combustion parameters are highly responsive during a correction, and thus a deviation (correction deviation) of the center-of-gravity position of a heat generation rate resulting from the correction is easily calculated. In this regard, it is desirable that the injection system parameters are used as the parameters controlling the center-of-gravity position of a heat generation rate.

In a case where the center-of-gravity position of a heat generation rate is controlled by the use of the injection system parameters as described above, however, the amount of change per unit crank angle in the pressure inside a combustion chamber (in-cylinder pressure) increases and effects on noise and vibration resulting from the combustion such as combustion noise increase. As a result, a user (such as a driver) or the like of the vehicle in which the engine is mounted as a power source might feel uncomfortable therewith. Accordingly, when fuel economy is to be improved with the combustion state of the engine being maintained in a specific state, it is desirable that attention is paid to suppressing the noise and vibration which result in the user's discomfort as well as maintaining the center-of-gravity position of a heat generation rate at a predetermined fixed value regardless of the engine load and/or the engine rotational speed.

Accordingly, in this technical field, there is a demand for an engine control device that is capable of improving fuel economy by maintaining the center-of-gravity position of a heat generation rate at a fixed crank angle while suppressing an increase in noise and vibration which result in a user's discomfort. An object of the invention is to provide an engine control device that is capable of improving fuel economy by maintaining the center-of-gravity position of a heat generation rate at a fixed crank angle while suppressing an increase in noise and vibration which result in a user's discomfort.

The above-described object of the invention is achieved by an engine control device provided with a combustion control unit setting a combustion parameter controlling a combustion state of fuel supplied to a cylinder of an internal combustion engine provided with a turbocharger, in which the combustion control unit sets the combustion parameter such that a center-of-gravity position of a heat generation rate determined by a heat generation rate as the amount per unit crank angle of heat generated by combustion of the fuel corresponds to a first crank angle when a load of the engine is within a specific load range between at least a first threshold and a second threshold exceeding the first threshold, in which the combustion control unit executes an increase in a turbocharging pressure of the turbocharger when a rotational speed of the engine is lower than a first rotational speed and a speed of a vehicle in which the engine is mounted is lower than a first speed in a case where the center-of-gravity position of a heat generation rate is further on a retard side than the first crank angle, and in which the combustion control unit executes one or both of an increase in a fuel injection pressure and advancing of a fuel injection timing when the rotational speed of the engine is equal to or higher than the first rotational speed or the speed of the vehicle is equal to or higher than the first speed in the case where the center-of-gravity position of a heat generation rate is further on the retard side than the first crank angle.

According to the invention, a parameter used for controlling the center-of-gravity position of a heat generation rate is properly used depending on operating situations of the engine and the vehicle in which the engine is mounted, and thus fuel economy can be improved by the center-of-gravity position of a heat generation rate being maintained at a predetermined fixed value regardless of the load of the engine and/or the engine rotational speed while an increase in noise and vibration a user feels uncomfortable with is suppressed.

The other objects, the other features, and the additional advantages of the invention will be easily understood with the following description of each aspect of the invention referring to accompanying drawings.

BRIEF DESCRIPTION OF THE DRAWINGS

FIGS. 1A and 1B are graphs for showing the center-of-gravity position of a heat generation rate (the center-ofgravity crank angle of a heat generation rate), in which FIG. 1A illustrates a combustion waveform pertaining to a case where pilot injection and main injection are performed at a predetermined timing and FIG. 1B illustrates a combustion waveform pertaining to a case where the pilot injection is further advanced than in FIG. 1A.

MODES FOR CARRYING OUT THE INVENTION

Figure 1A:
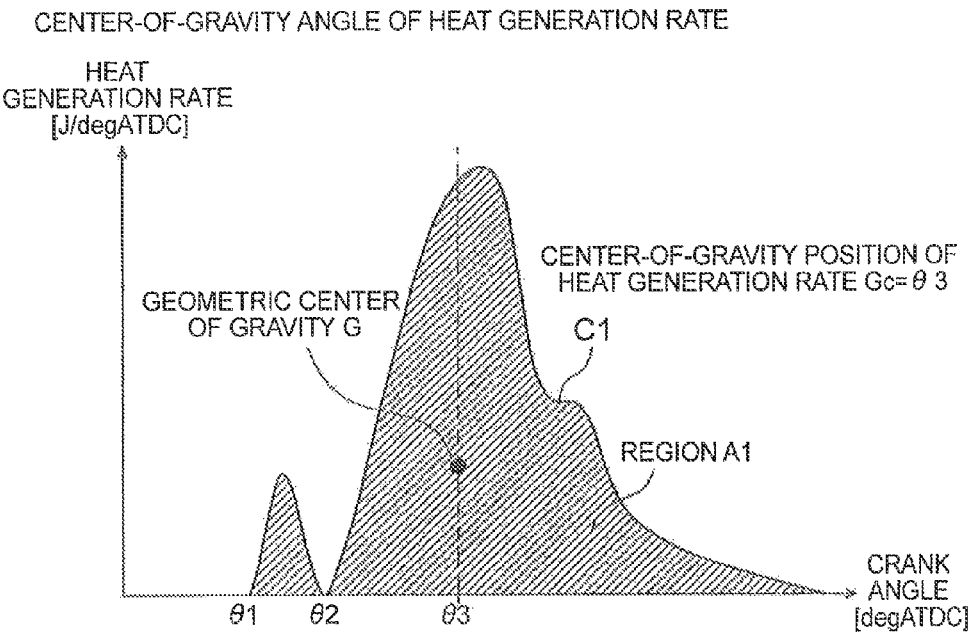

As described above, an object of the invention is to provide an engine control device that is capable of improving fuel economy by maintaining the center-of-gravity position of a heat generation rate at a fixed crank angle (first crank angle) while suppressing an increase in noise and vibration which a user feels uncomfortable with.

As a result of intensive studies for achieving the object, the inventor has found that fuel economy can be improved when the center-of-gravity position of a heat generation rate is maintained at a predetermined fixed value regardless of an engine load and/or an engine rotational speed while an increase in noise and vibration which a user feels uncomfortable with are suppressed by a parameter used for the control of the center-of-gravity position of a heat generation rate being properly used depending on operating situations of an engine and a vehicle in which the engine is mounted. The invention has been derived from these findings.

According to a first aspect of the invention, there is provided an engine control device provided with a combustion control unit setting a combustion parameter controlling a combustion state of fuel supplied to a cylinder of an internal combustion engine provided with a turbocharger, in which the combustion control unit sets the combustion parameter such that a center-of-gravity position of a heat generation rate determined by a heat generation rate as the amount per unit crank angle of heat generated by combustion of the fuel corresponds to a first crank angle when a load of the engine is within a specific load range between at least a first threshold and a second threshold exceeding the first threshold, in which the combustion control unit executes an increase in a turbocharging pressure of the turbocharger when a rotational speed of the engine is lower than a first rotational speed and a speed of a vehicle in which the engine is mounted is lower than a first speed in a case where the center-of-gravity position of a heat generation rate is further on a retard side than the first crank angle, and in which the combustion control unit executes one or both of an increase in a fuel injection pressure and advancing of a fuel injection timing when the rotational speed of the engine is equal to or higher than the first rotational speed or the speed of the vehicle is equal to or higher than the first speed in the case where the center-of-gravity position of a heat generation rate is further on the retard side than the first crank angle.

As described above, the engine control device according to this aspect is applied to an internal combustion engine that is provided with a turbocharger. In addition, the engine control device according to this aspect is provided with a combustion control unit that controls a combustion state of fuel which is supplied to a cylinder of the internal combustion engine.

The combustion control unit sets the combustion parameter such that a center-of-gravity position of a heat generation rate determined by a heat generation rate as the amount per unit crank angle of heat generated by combustion of the fuel corresponds to a first crank angle when a load of the engine is within a specific load range between at least a first threshold and a second threshold exceeding the first threshold.

The first threshold may be the minimum value of the load allowed for the engine or may be a value exceeding the minimum value. The second threshold may be the maximum value of the load allowed for the engine or may be a value less than the maximum value. In other words, the engine control device according to this aspect may set the combustion parameter such that the center-of-gravity position of a heat generation rate corresponds to the first crank angle across an entire load range allowed for the engine or may set the combustion parameter such that the center-of-gravity position of a heat generation rate corresponds to the first crank angle only in a specific load range. In addition, controlling the combustion state is substantially synonymous to setting the combustion parameter (that is, setting an appropriate value and changing to an appropriate value in accordance with an operation state of the engine by feedforward control and/or feedback control of the combustion parameter). The combustion parameter will be described in detail later.

According to the engine control device of this aspect, the center-of-gravity position of a heat generation rate is maintained at the first crank angle when at least the load of the engine is within the specific load range. Accordingly, the running cost of the engine can be effectively reduced when the first crank angle is set to, for example, a crank angle of optimal fuel economy. In addition, the total running cost of the engine may be effectively reduced by, for example, the first crank angle being set to a predetermined crank angle such as a crank angle at which the total running cost (cost actually required for the traveling of the vehicle in which the engine is mounted) also including the running cost not associated with fuel economy is minimized.

A target center-of-gravity position (first crank angle) as a control target value for the center-of-gravity position of a heat generation rate that allows the fuel economy of the engine to be improved, allows the total running cost to be reduced, and the like can be obtained in advance by a prior experiment or the like. In addition, a combination of various combustion parameters that allows the obtained target center-of-gravity position (first crank angle) to be achieved can be obtained in advance by a prior experiment or the like. The obtained target center-of-gravity position (first crank angle) and the combination of combustion parameters corresponding to the target center-of-gravity position (first crank angle) can be, for example, stored in data storage means (such as a ROM) of an engine electronic control unit (ECU) described later, read in accordance with the actual operation state of the engine, and used during control for allowing the center-of-gravity position of a heat generation rate to correspond to the target center-of-gravity position (first crank angle).

The center-of-gravity position of a heat generation rate can be defined by various methods as follows.

Definition 1

As illustrated in FIG. 1A, the center-of-gravity position of a heat generation rate Gc is a crank angle (θ3 in FIG. 1A) corresponding to the geometric center of gravity G of a region surrounded by a waveform of the heat generation rate drawn in a "coordinate system (graph) in which a crank angle of a single combustion stroke is set on a horizontal axis (one axis) and the heat generation rate (the amount of heat generation per unit crank angle) is set on a vertical axis (the other axis orthogonal to the one axis)" and the horizontal axis (the one axis).

Definition 2

The center-of-gravity position of a heat generation rate Gc is a specific crank angle at which the areas of two regions divided from each other by the specific crank angle are equal to each other when a region surrounded by a waveform of the heat generation rate drawn in a "coordinate system (graph) in which a crank angle of a single combustion stroke is set on a horizontal axis (one axis) and the heat generation rate (the amount of heat generation per unit crank angle) is set on a vertical axis (the other axis orthogonal to the one axis)" and the horizontal axis (the one axis) is divided by the specific crank angle.

Definition 3

Alternatively, the center-of-gravity position of a heat generation rate Gc is a crank angle Gc that satisfies the following Equation (1). In Equation (1), CAs is a crank angle at which the combustion of the fuel begins, CAe is a crank angle at which the combustion terminates, θ is an arbitrary crank angle, and dQ(θ) is the heat generation rate at the crank angle θ. In other words, the center-of-gravity position of a heat generation rate Gc is a specific crank angle between combustion initiation and combustion termination of a single combustion stroke at which a value obtained by integrating a product of the "magnitude of the difference between an arbitrary first crank angle between the combustion initiation and the specific crank angle and the specific crank angle" and the "heat generation rate at the arbitrary first crank angle" with respect to a crank angle from the combustion initiation to the specific crank angle is equal to a value obtained by integrating a product of the "magnitude of the difference between an arbitrary second crank angle between the specific crank angle and the combustion termination and the specific crank angle" and the "heat generation rate at the arbitrary second crank angle" with respect to a crank angle from the specific crank angle to the combustion termination.

$$\int_{CAs}^{Gc}(Gc-\theta)dQ(\theta)d\theta = \int_{Gc}^{CAe}(\theta-Gc)dQ(\theta)d\theta \quad (1)$$

Definition 3'

The following Equation (2) is obtained when Equation (1) above is modified.

$$\int_{CAs}^{CAe}(\theta-Gc)dQ(\theta)d\theta = 0 \quad (2)$$

Accordingly, to put Definition 3 another way, the center-of-gravity position of a heat generation rate Gc is a specific crank angle between combustion initiation and combustion termination of a single combustion stroke at which a value obtained by integrating a value corresponding to a product of a value obtained by subtracting the specific crank angle from an arbitrary crank angle and the heat generation rate at the arbitrary crank angle with respect to a crank angle from the combustion initiation to the combustion termination becomes "0".

Definition 4

Based on Definitions 1 to 3', the center-of-gravity position of a heat generation rate Gc is defined as a value obtained by adding a combustion initiation crank angle (CAs) to a value obtained by dividing an integral value of a product of a value obtained by subtracting the combustion initiation crank angle (CAs) from an arbitrary crank angle of a single combustion stroke and the heat generation rate at the arbitrary crank angle by the area of a region defined by a waveform of the heat generation rate with respect to a crank angle.

Definition 5

In other words, the center-of-gravity position of a heat generation rate Gc is defined as a crank angle obtained by a calculation based on the following Equation (3).

$$Gc = \frac{\int_{CAs}^{CAe}(\theta - CAs)dQ(\theta)d\theta}{\int_{CAs}^{CAe}dQ(\theta)d\theta} + CAs \quad (3)$$

Figure 1B:
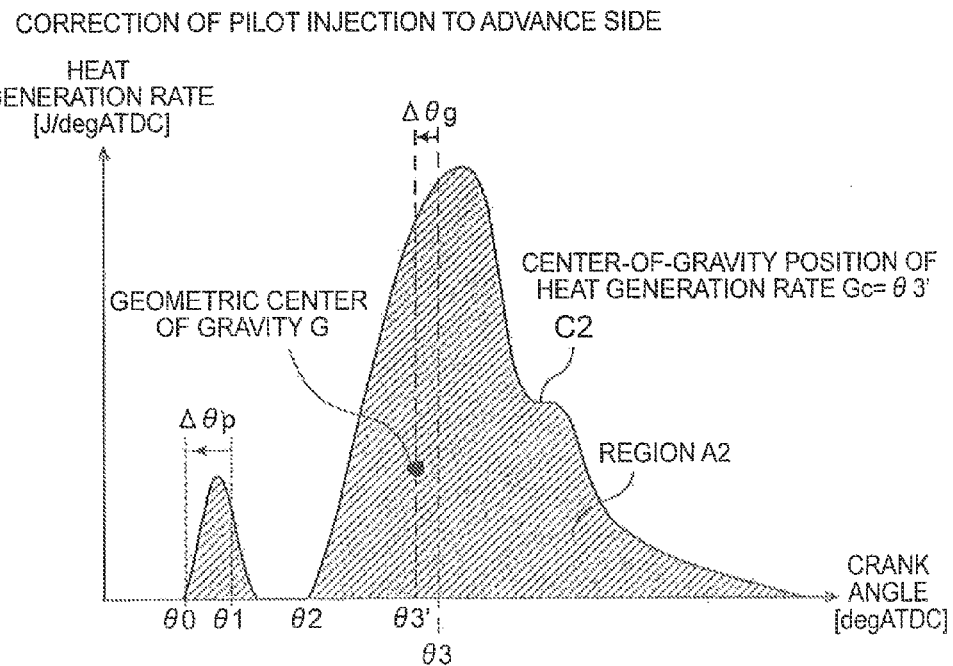

The center-of-gravity position of a heat generation rate Gc that is defined in various manners as described above is the crank angle θ3 in the example which is illustrated in FIG. 1A. When the center-of-gravity position of a heat generation rate Gc is set to a crank angle θ0 with a pilot injection initiation timing moved toward an advance side by a margin of Δθp from a crank angle θ1 as illustrated in FIG. 1B, the center-of-gravity position of a heat generation rate Gc becomes crank angle θ3' after being moved toward the advance side by a margin of a crank angle Δθg. As is apparent herein, it can be said that the center-of-gravity position of a heat generation rate is an index value more accurately reflecting the combustion state than the angle of the combustion center of gravity as an index value for a combustion state according to the related art. The actual center-of-gravity position of a heat generation rate can be estimated based on an in-cylinder pressure that is detected by in-cylinder pressure detecting means such as a combustion pressure sensor.

Figure 2:
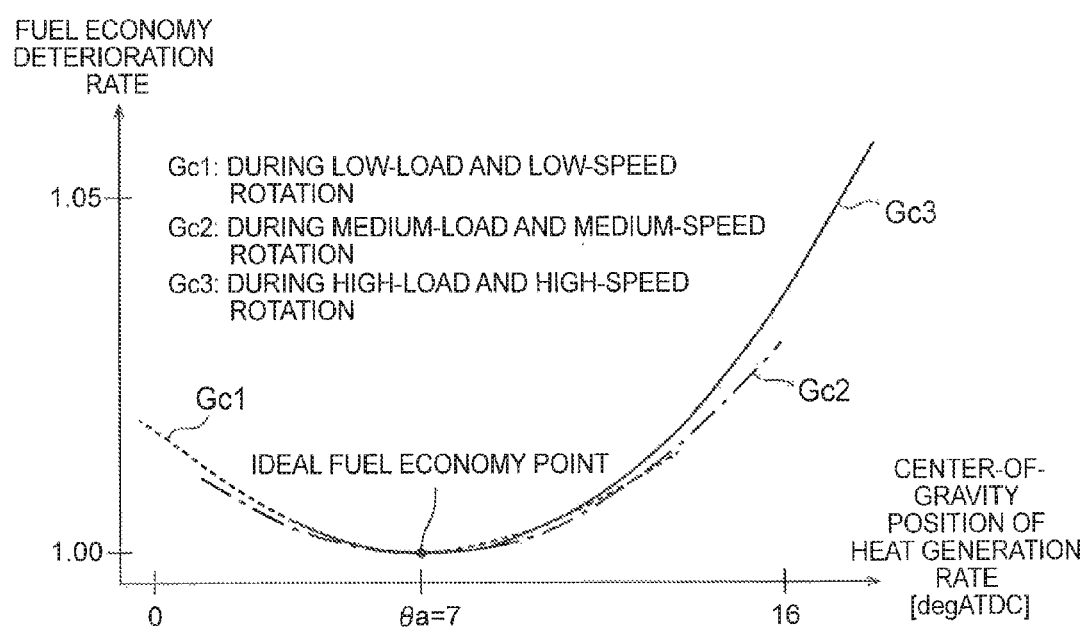
FIG. 2 is a graph illustrating a relationship between the center-of-gravity position of a heat generation rate and a fuel economy deterioration rate for each combination of an engine rotational speed and an engine load.
Figure 9:
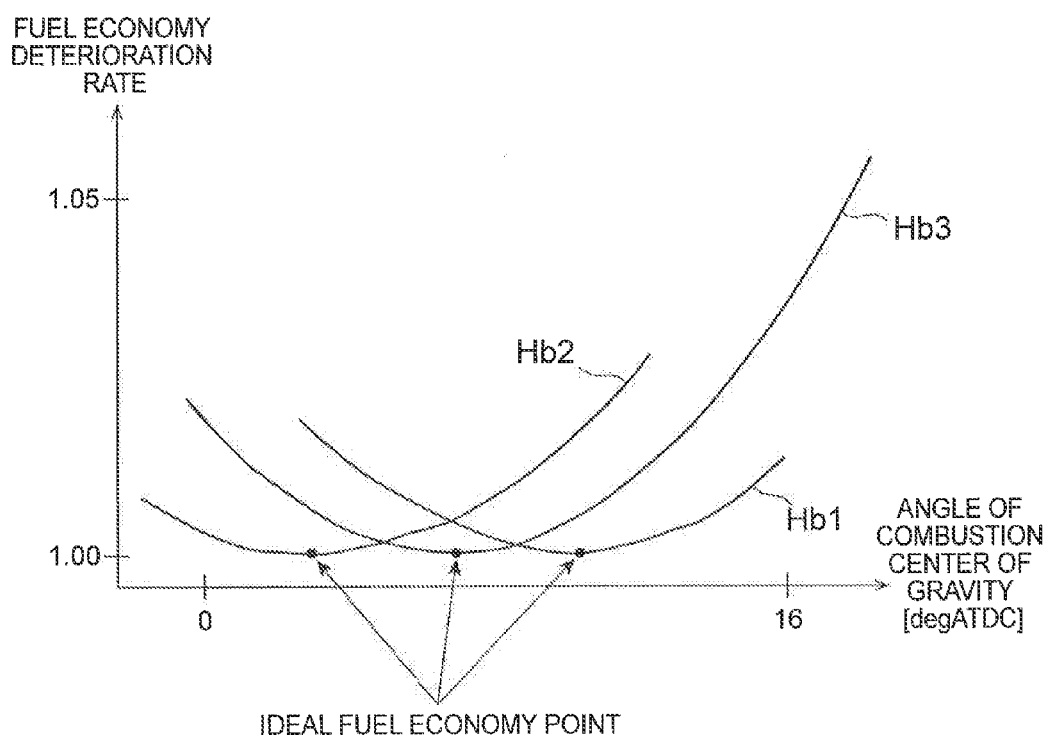
FIG. 9 is a graph illustrating a relationship between the angle of the combustion center of gravity and the fuel economy deterioration rate for each engine rotational speed.

The inventor measured a "relationship between the center-of-gravity position of a heat generation rate and a fuel economy deterioration rate" with respect to various combinations between the "load of the engine (required torque) and the engine rotational speed". The results of the measurement are illustrated in FIG. 2. Curves Gc1 to Gc3 in FIG. 2 show the measurement results pertaining to the case of a low rotational speed and a low load, the case of a medium rotational speed and a medium load, and the case of a high rotational speed and a high load, respectively. As shown in FIG. 2, the center-of-gravity position of a heat generation rate at which the fuel economy deterioration rate is minimized is a specific (fixed) crank angle θa (7° past the compression top dead center in the example illustrated in FIG. 2) even in a case where the engine rotational speed and the engine load vary. In addition, it has been found that the fuel economy deterioration rate becomes a substantially fixed value near the minimum value, even when the engine load and/or the engine rotational speed changes, insofar as the center-of-gravity position of a heat generation rate is closer to the crank angle θa than the angle of the combustion center of gravity illustrated in FIG. 9.

Based on the above, the inventor has found that the center-of-gravity position of a heat generation rate is an index value that appropriately shows the combustion state, and thus the combustion state of the engine can be maintained in a specific state and the fuel economy of the engine can be improved when the center-of-gravity position of a heat generation rate is maintained at a predetermined fixed value (such as a value near the crank angle θa) regardless of the engine load and/or the engine rotational speed. In this regard, the inventor has given a thought to an engine control device that maintains the center-of-gravity position of a heat generation rate at a fixed crank angle (first crank angle) regardless of an engine load and/or an engine rotational speed.

As described above, the combustion state of fuel (air-fuel mixture) in an engine changes depending the multiple combustion parameters including a fuel injection timing and a turbocharging pressure. Accordingly, the center-of-gravity position of a heat generation rate described above also changes depending on the combustion parameters including a fuel injection timing, a fuel injection pressure, the amount of fuel injected by pilot injection, and a turbocharging pressure. In other words, in a case where the combustion state of an engine is to be maintained in a specific state for fuel economy improvement with the center-of-gravity position of a heat generation rate being maintained at a predetermined fixed value regardless of an engine load and/or an engine rotational speed as described above, the combustion parameters including a fuel injection timing, a fuel injection pressure, the amount of fuel injected by pilot injection, and a turbocharging pressure can be used as parameters that control the center-of-gravity position of a heat generation rate. One or more of the following values can be adopted as the combustion parameter.

(1) Timing of main injection (2) Fuel injection pressure as pressure during fuel injection from a fuel injection valve (3) Injection quantity of the pilot injection as fuel injection performed further on the advance side than the main injection (4) Number of the pilot injections (5) Timing of the pilot injection (6) Fuel injection quantity of the pilot injection (7) Injection quantity of after-injection as fuel injection performed further on the retard side than the main injection (8) Turbocharging pressure of the turbocharger (9) Cooling efficiency (cooling performance) of an intercooler

(10) EGR ratio as the ratio of EGR gas to intake air (or the amount of the EGR gas)

(11) Ratio of the amount of high-pressure EGR gas allowed to flow back by a high-pressure EGR device to the amount of low-pressure EGR gas allowed to flow back by a low-pressure EGR device (high/low pressure EGR ratio)

(12) Cooling efficiency (cooling performance) of an EGR cooler

(13) Intensity of a swirl flow in the cylinder (such as a swirl control valve opening degree)

The cooling efficiency of the intercooler and the cooling efficiency of the EGR cooler are for the control of the intake temperature of the engine after all, and thus it can be said that the intake temperature of the engine is one of the combustion parameters. Examples of specific means for reducing the cooling efficiency of these coolers (raising the intake temperature) can include decreasing the amount of a refrigerant that flows into these coolers and raising the ratio of the amount of gas flowing through a bypass passage to the amount of gas flowing through these coolers based on an increase in the opening degree of a bypass valve which adjusts the flow rate of the gas flowing through the bypass passage mounted in these coolers. Examples of specific means for raising the cooling efficiency of these coolers (reducing the intake temperature) can include increasing the amount of the refrigerant that flows into these coolers and reducing the ratio of the amount of the gas flowing through the bypass passage to the amount of the gas flowing through these coolers based on a decrease in the opening degree of the bypass valve which adjusts the flow rate of the gas flowing through the bypass passage mounted in these coolers.

The EGR ratio means, to be more specific, the ratio of the amount of the low-pressure EGR gas allowed to flow back by the low-pressure EGR device to the amount of the intake air in a case where the low-pressure EGR device provided in the engine and allowing exhaust gas further downstream than a turbine of the turbocharger arranged in an exhaust passage of the engine to flow back toward an intake passage of the engine is used. The EGR ratio means the ratio of the amount of the high-pressure EGR gas allowed to flow back by the high-pressure EGR device to the amount of the intake air in a case where the high-pressure EGR device provided in the engine and allowing exhaust gas further upstream than the turbine of the turbocharger to flow back toward the intake passage is used. In a case where both the low-pressure EGR device and the high-pressure EGR device are used, the EGR ratio means the ratio of the total amount of the low-pressure EGR gas and the high-pressure EGR gas allowed to flow back by the EGR devices to the amount of the intake air.

In a case where the center-of-gravity position of a heat generation rate Gc is advanced by the use of the combustion parameters described above, the engine control device may perform the following operations.

(1a) The engine control device moves the timing of the main injection toward the advance side.

(2a) The engine control device increases the fuel injection pressure.

(3a) The engine control device increases the injection quantity of the pilot injection.

(4a) The engine control device changes the number of the pilot injections such that the center-of-gravity position of a heat generation rate of the pilot injection determined solely with regard to the pilot injection (hereinafter, referred to as the "center-of-gravity position of a pilot heat generation rate") is moved toward the advance side.

(5a) The engine control device changes the timing of the pilot injection such that the center-of-gravity position of a pilot heat generation rate is moved toward the advance side.

(6a) The engine control device changes the fuel injection quantity of the pilot injection such that the center-of-gravity position of a pilot heat generation rate is moved toward the advance side.

(7a) The engine control device decreases the injection quantity of the after-injection or does not perform the after-injection.

(8a) The engine control device increases the turbocharging pressure.

(9a) The engine control device reduces the cooling efficiency of the intercooler (raises the intake temperature).

(10a) The engine control device reduces the EGR ratio (decreases an EGR amount).

(11a) The engine control device reduces the high/low pressure EGR ratio.

(12a) The engine control device reduces the cooling efficiency of the EGR cooler (raises the intake temperature).

(13a) The engine control device increases the intensity of the swirl flow.

In a case where the center-of-gravity position of a heat generation rate Gc is retarded by the use of the combustion parameters described above, the engine control device may perform the following operations.

(1b) The engine control device moves the timing of the main injection toward the retard side.

(2b) The engine control device decreases the fuel injection pressure.

(3b) The engine control device decreases the injection quantity of the pilot injection.

(4b) The engine control device changes the number of the pilot injections such that the center-of-gravity position of a pilot heat generation rate is moved toward the retard side.

(5b) The engine control device changes the timing of the pilot injection such that the center-of-gravity position of a pilot heat generation rate is moved toward the retard side.

(6b) The engine control device changes the fuel injection quantity of the pilot injection such that the center-of-gravity position of a pilot heat generation rate is moved toward the retard side.

(7b) The engine control device increases the injection quantity of the after-injection.

(8b) The engine control device decreases the turbocharging pressure.

(9b) The engine control device raises the cooling efficiency of the intercooler (reduces the intake temperature).

(10b) The engine control device raises the EGR ratio (increases the EGR amount).

(11b) The engine control device raises the high/low pressure EGR ratio.

(12b) The engine control device raises the cooling efficiency of the EGR cooler (reduces the intake temperature).

(13b) The engine control device reduces the intensity of the swirl flow.

Parameters relating to fuel injection such as the fuel injection timing and the fuel injection pressure (injection system parameters) among these combustion parameters are highly responsive during a correction as described above, and thus a deviation (correction deviation) of the center-of-gravity position of a heat generation rate resulting from the correction is easily calculated. In this regard, it is desirable that the injection system parameters are used as the parameters controlling the center-of-gravity position of a heat generation rate.

In a case where the center-of-gravity position of a heat generation rate is controlled by the use of the injection system parameters as described above, however, the amount of change per unit crank angle in the pressure inside a combustion chamber (in-cylinder pressure) increases and effects on noise and vibration resulting from the combustion such as combustion noise increase. As a result, a user (such as a driver) or the like of the vehicle in which the engine is mounted as a power source might feel uncomfortable therewith. In a case where the rotational speed of the engine and the speed of the vehicle in which the engine is mounted are low in particular, the levels of the noise and vibration that occur when the engine and the vehicle are in operation are low, and thus a change in the noise and vibration resulting from the combustion of the fuel tends to be easily sensed by the user.

Accordingly, when fuel economy is to be improved with the center-of-gravity position of a heat generation rate being maintained at a predetermined fixed value in a case where the rotational speed of the engine is lower than the first rotational speed and the speed of the vehicle in which the engine is mounted as a power source is lower than the first speed, it is desirable that the center of gravity of a heat generation rate is controlled by the use of a combustion parameter less likely to cause an increase in the noise and vibration which the user feels uncomfortable with. Specific examples of this combustion parameter can include the turbocharging pressure of the turbocharger.

In a case where the rotational speed of the engine or the speed of the vehicle in which the engine is mounted are high, the level of the noise and/or vibration that occurs when the engine and the vehicle are in operation is high, and thus the change in the noise and vibration resulting from the combustion of the fuel tends to be less likely to be sensed by the user. Accordingly, in this case, it is desirable that the center of gravity of a heat generation rate is controlled by the use of a combustion parameter highly responsive during the correction and facilitating the calculation of the deviation (correction deviation) of the center-of-gravity position of a heat generation rate resulting from the correction as described above. Specific examples of this combustion parameter can include the parameters relating to fuel injection such as the fuel injection timing and the fuel injection pressure (injection system parameters).

Accordingly, in the engine control device of this aspect, the combustion control unit executes an increase in the turbocharging pressure of the turbocharger when the rotational speed of the engine is lower than the first rotational speed and the speed of the vehicle in which the engine is mounted is lower than the first speed in a case where the center-of-gravity position of a heat generation rate is further on the retard side than the first crank angle, and the combustion control unit executes one or both of an increase in the fuel injection pressure and the advancing of the fuel injection timing when the rotational speed of the engine is equal to or higher than the first rotational speed or the speed of the vehicle is equal to or higher than the first speed in the case where the center-of-gravity position of a heat generation rate is further on the retard side than the first crank angle.

In the above, the rotational speed of the engine (engine rotational speed) can be acquired by the engine electronic control unit (ECU) described later based on, for example, signals from a crank angle sensor and a cam position sensor outputting signals in accordance with the rotational position of a crankshaft (that is, a crank angle). The speed of the vehicle in which the engine is mounted (traveling speed, vehicle speed) can be detected by a vehicle speed sensor.

In the above, a combination of the first rotational speed and the first speed can be defined as, for example, a combination of the minimum values of the engine rotational speed and the vehicle speed at which no increase in the noise and vibration which the user feels uncomfortable with substantially occurs while the center-of-gravity position of a heat generation rate is advanced by one or both of the increase in the fuel injection pressure and the advancing of the fuel injection timing. In other words, it is not desirable to advance the center-of-gravity position of a heat generation rate by one or both of the increase in the fuel injection pressure and the advancing of the fuel injection timing while the engine rotational speed is lower than the first rotational speed and the vehicle speed is lower than the first speed since the noise and vibration which the user feels uncomfortable with substantially increase in this case. The combination of the first rotational speed and the first speed can be specified by, for example, the noise and vibration resulting from the operations of the engine and the vehicle at various combinations of the engine rotational speed and the vehicle speed being obtained in advance based on a prior experiment or the like. When the combination of the first rotational speed and the first speed is specified, wind noise, road noise, or the like may be taken into consideration in addition to the noise and vibration resulting from the operations of the engine and the vehicle.

The engine to which the engine control device according to this aspect is applied needs to be provided with a mechanism that is capable of adjusting the turbocharging pressure of the turbocharger. Specific examples of the mechanism can include a nozzle vane, a bypass valve (wastegate valve for exhaust pressure adjustment), and an exhaust throttle valve. In addition, the engine to which the engine control device according to this aspect is applied needs to be provided with a mechanism that is capable of adjusting the fuel injection pressure and/or the fuel injection timing. In a case where the engine is provided with a fuel supply system including a fuel pressure pump (supply pump), a fuel delivery tube, a common rail (accumulator), and a fuel injection valve (injector), for example, the fuel injection pressure can be adjusted based on the control of the fuel pressure pump, the fuel injection timing can be adjusted based on the control of a valve-opening operation of the fuel injection valve (injector), and so on in the event of an instruction from the engine electronic control unit (ECU) described later.

According to the above, the center of gravity of a heat generation rate is controlled by the turbocharging pressure, which is a combustion parameter less likely to cause an increase in the noise and vibration which the user feels uncomfortable with, in a case where the rotational speed of the engine and the speed of the vehicle in which the engine is mounted are low although the change in the noise and vibration resulting from the combustion of the fuel is easily sensed by the user in this case. Accordingly, an acceleration performance can be ensured while an increase in the noise and vibration which the user feels uncomfortable with is suppressed. The center of gravity of a heat generation rate is controlled by the injection system parameter, which is a combustion parameter highly responsive during the correction and facilitating the calculation of the correction deviation, in a case where the rotational speed of the engine or the speed of the vehicle in which the engine is mounted are high. As described above, the engine control device according to this aspect properly uses the parameters used for the control of the center-of-gravity position of a heat generation rate depending on the operating situations of the engine and the vehicle in which the engine is mounted, and thus can improve fuel economy by maintaining the center-of-gravity position of a heat generation rate at a predetermined fixed value regardless of the load of the engine and/or the engine rotational speed while suppressing an increase in the noise and vibration which the user feels uncomfortable with.

In the engine control device according to this embodiment, the combustion control unit executes one or both of the increase in the fuel injection pressure and the advancing of the fuel injection timing when the rotational speed of the engine is equal to or higher than the first rotational speed or the speed of the vehicle in which the engine is mounted is equal to or higher than the first speed in a case where the center-of-gravity position of a heat generation rate is further on the retard side than the first crank angle as described above. In other words, in the engine control device according to this aspect, any one or both of the increase in the fuel injection pressure and the advancing of the fuel injection timing may be executed when the rotational speed of the engine is equal to or higher than the first rotational speed in a case where the center-of-gravity position of a heat generation rate is further on the retard side than the first crank angle. Likewise, any one or both of the increase in the fuel injection pressure and the advancing of the fuel injection timing may be executed when the speed of the vehicle in which the engine is mounted is equal to or higher than the first speed.

The following three cases are assumed in a case where the combustion control unit executes one or both of the increase in the fuel injection pressure and the advancing of the fuel injection timing when the center-of-gravity position of a heat generation rate is further on the retard side than the first crank angle as described above.

(a) Case where the engine rotational speed is equal to or higher than the first rotational speed and the speed of the vehicle in which the engine is mounted (vehicle speed) is equal to or higher than the first speed (b) Case where the engine rotational speed is equal to or higher than the first rotational speed and the vehicle speed is lower than the first speed (c) Case where the engine rotational speed is lower than the first rotational speed and the vehicle speed is equal to or higher than the first speed In the case of (c) among the three cases, the rotational speed of the engine is lower than the first rotational speed although the vehicle speed is equal to or higher than the first speed. In this case, the levels of the noise and vibration occurring in the engine are low, and thus a situation in which the change in the noise and vibration resulting from the combustion of the fuel is likely to be easily sensed by the user is also assumed in a case where, for example, the levels of the wind noise and the road noise are low. Accordingly, it is desirable that a parameter less affecting the combustion noise is selected when the control of the center of gravity of a heat generation rate is performed by the use of the injection system parameter in a case where the speed of the vehicle in which the engine is mounted is high and the rotational speed of the engine is low.

According to the engine control device of this embodiment, the injection system parameters that are used for the advancing of the center-of-gravity position of a heat generation rate when the rotational speed of the engine is equal to or higher than the first rotational speed or the speed of the vehicle in which the engine is mounted is equal to or higher than the first speed in a case where the center-of-gravity position of a heat generation rate is further on the retard side than the first crank angle include the fuel injection pressure and the fuel injection timing. The fuel injection pressure surpasses the fuel injection timing when it comes to the effect on the combustion noise. Accordingly, when the control of the center of gravity of a heat generation rate is performed by the use of the injection system parameter in a case where the speed of the vehicle in which the engine is mounted is high and the rotational speed of the engine is low, it is desirable that the control of the center of gravity of a heat generation rate is performed based on a change in not the fuel injection pressure which has a relatively greater effect on the combustion noise but the fuel injection timing which has a relatively less effect on the combustion noise.

In the case of (b) and (a) above, the rotational speed of the engine is equal to or higher than the first rotational speed. In this case, the levels of the noise and vibration occurring in the engine are high, and thus the change in the noise and vibration resulting from the combustion of the fuel tends to be less likely to be sensed by the user. In this case, a substantial increase in the noise and vibration which the user feels uncomfortable with is unlikely to be caused even when the fuel injection pressure which has a relatively greater effect on the combustion noise is selected during the control of the center of gravity of a heat generation rate. Accordingly, when the control of the center of gravity of a heat generation rate is performed by the use of the injection system parameter in a case where the engine rotational speed is high, the control of the center of gravity of a heat generation rate may be performed based on a change in the fuel injection pressure which has a relatively greater effect on the combustion noise.

In other words, in the engine control device according to a second aspect of the invention, which is based on the engine control device according to the first aspect of the invention, the combustion control unit executes only the advancing of the fuel injection timing, even when the speed of the vehicle is equal to or higher than the first speed, when the rotational speed of the engine is lower than the first rotational speed in a case where the center-of-gravity position of a heat generation rate is further on the retard side than the first crank angle, and the combustion control unit executes the increase in the fuel injection pressure when the rotational speed of the engine is equal to or higher than the first rotational speed in the case where the center-of-gravity position of a heat generation rate is further on the retard side than the first crank angle.

As described above, the engine control device according to this aspect also executes one or both of the increase in the fuel injection pressure and the advancing of the fuel injection timing when the rotational speed of the engine is equal to or higher than the first rotational speed or the speed of the vehicle in which the engine is mounted (vehicle speed) is equal to or higher than the first speed in a case where the center-of-gravity position of a heat generation rate is further on the retard side than the first crank angle. In this case, the combustion control unit in the engine control device according to this aspect scrupulously and properly uses the fuel injection timing and the fuel injection pressure as the parameters used for the control of the center of gravity of a heat generation rate depending on the situations of the rotational speed of the engine and the vehicle speed as described above.

More specifically, in the engine control device according to this aspect, the combustion control unit executes the advancing of the fuel injection timing, even when the speed of the vehicle is equal to or higher than the first speed, when the rotational speed of the engine is lower than the first rotational speed in a case where the center-of-gravity position of a heat generation rate is further on the retard side than the first crank angle. In a case where the engine rotational speed is low despite a high vehicle speed, the levels of the noise and vibration occurring in the engine are low as described above, and thus the change in the noise and vibration resulting from the combustion of the fuel tends to be easily sensed by the user. In this regard, the engine control device according to this aspect performs the control of the center of gravity of a heat generation rate based on a change in not the fuel injection pressure which has a relatively greater effect on the combustion noise but the fuel injection timing which has a relatively less effect on the combustion noise when the control of the center of gravity of a heat generation rate is performed by the use of the injection system parameter in this situation. Accordingly, fuel economy can be improved by the center-of-gravity position of a heat generation rate being maintained at a predetermined fixed value while an increase in the noise and vibration which the user feels uncomfortable with is effectively suppressed.

In the engine control device according to this aspect, the combustion control unit executes the increase in the fuel injection pressure when the rotational speed of the engine is equal to or higher than the first rotational speed in a case where the center-of-gravity position of a heat generation rate is further on the retard side than the first crank angle. As described above, the levels of the noise and vibration occurring in the engine are high in a case where the engine rotational speed is high, and thus the change in the noise and vibration resulting from the combustion of the fuel tends to be less likely to be sensed by the user. When the control of the center of gravity of a heat generation rate is performed by the use of the injection system parameter in this situation, the engine control device according to this aspect performs the control of the center of gravity of a heat generation rate by first changing the fuel injection pressure which has a relatively greater effect on the combustion noise. Accordingly, fuel economy can be improved by the center-of-gravity position of a heat generation rate being maintained at a predetermined fixed value while an increase in the noise and vibration which the user feels uncomfortable with is suppressed.

In an operation region where the rotational speed of the engine is high, however, a high fuel injection pressure is set in some cases. In this situation, there might be little room for a rise in the fuel injection pressure. As a result, it might be difficult to sufficiently advance the center of gravity of a heat generation rate by the increase in the fuel injection pressure alone. In this case, the control of the center of gravity of a heat generation rate based on a change in the fuel injection timing may be additionally performed. In other words, the center-of-gravity position of a heat generation rate may be further advanced based on the advancing of the fuel injection timing in a case where the center-of-gravity position of a heat generation rate advanced by the execution of the increase in the fuel injection pressure by the combustion control unit when the rotational speed of the engine is equal to or higher than the first rotational speed in a case where the center-of-gravity position of a heat generation rate is further on the retard side than the first crank angle as described above still remains further on the retard side than the first crank angle.

In the case of (a) described above, the engine rotational speed is equal to or higher than the first rotational speed and the speed of the vehicle in which the engine is mounted (vehicle speed) is equal to or higher than the first speed. In this case, a situation is assumed in which the levels of the noise and vibration occurring in the engine are high and the levels of the wind noise, the road noise, and the like are also high. In other words, in this case, the change in the noise and vibration resulting from the combustion of the fuel tends to be very unlikely to be sensed by the user. Accordingly, in a case where the speed of the vehicle in which the engine is mounted is high and the rotational speed of the engine is high, any one or both of the fuel injection pressure and the fuel injection timing may be selected as the injection system parameter for the control of the center of gravity of a heat generation rate.

From the point of view of the high level of responsiveness during the correction and the ease of the calculation of the deviation (correction deviation) of the center-of-gravity position of a heat generation rate resulting from the correction, however, it is desirable that the fuel injection timing is selected as the injection system parameter for the control of the center-of-gravity position of a heat generation rate in a case where the speed of the vehicle in which the engine is mounted is high and the rotational speed of the engine is high. As described above, in the engine control device according to a modification example of the invention, the combustion control unit may further scrupulously and properly use the fuel injection timing and the fuel injection pressure as the parameters used for the control of the center of gravity of a heat generation rate depending on, for example, the situations of the rotational speed of the engine and the vehicle speed.

It is important that the acceleration performance is ensured for a high level of drivability to be maintained in a situation in which the speed of the vehicle is assumed to be increased (accelerated) in the future. When the center-of-gravity position of a heat generation rate is advanced by the increase in the fuel injection pressure and/or the advancing of the fuel injection timing, however, exhaust gas loss is reduced due to the increase in the fuel injection pressure and/or the advancing of the fuel injection timing, and then a reduction in the turbocharging pressure might be caused. When the turbocharging pressure is to be compensated for by, for example, a decrease in the opening degree of a nozzle vane and/or a bypass valve of a turbine of a variable capacity-type turbocharger in this case, pump loss is exacerbated (increases) and both fuel economy and the acceleration performance might be exacerbated as a result thereof.

Accordingly, in order for fuel economy to be improved while the acceleration performance is ensured in a situation in which the acceleration of the vehicle is required, control for preventing a decrement in torque attributable to an increase in the pump loss resulting from a compensation for a reduction in the turbocharging pressure resulting from the increase in the fuel injection pressure and/or the advancing of the fuel injection timing from exceeding an increment in torque resulting from the advancing of the center-of-gravity position of a heat generation rate is important.

Accordingly, in the engine control device according to a third aspect of the invention, which is based on the engine control device according to the first or second aspect of the invention, even when the rotational speed of the engine is equal to or higher than the first rotational speed or the speed of the vehicle is equal to or higher than the first speed in a case where the center-of-gravity position of a heat generation rate is further on the retard side than the first crank angle, the combustion control unit executes none of the increase in the fuel injection pressure and the advancing of the fuel injection timing when an accelerator opening degree of the engine exceeds a first opening degree and the absolute value of the increment in the torque attributable to the center-of-gravity position of a heat generation rate approaching the first crank angle because of the increase in the fuel injection pressure and/or the advancing of the fuel injection timing is determined to be less than the absolute value of the decrement in the torque attributable to an increase in the pump loss of the engine resulting from a compensation for a reduction in the turbocharging pressure resulting from the increase in the fuel injection pressure and/or the advancing of the fuel injection timing.

When the rotational speed of the engine is equal to or higher than the first rotational speed or the speed of the vehicle in which the engine is mounted is equal to or higher than the first speed in a case where the center-of-gravity position of a heat generation rate is further on the retard side than the first crank angle as described above, the combustion control unit in the engine control device according to each of the above-described aspects of the invention controls the center-of-gravity position of a heat generation rate such that the center-of-gravity position of a heat generation rate corresponds to the first crank angle by executing one or both of the increase in the fuel injection pressure and the advancing of the fuel injection timing. When the center-of-gravity position of a heat generation rate is advanced based on the increase in the fuel injection pressure and/or the advancing of the fuel injection timing as described above, however, the exhaust gas loss is reduced due to the increase in the fuel injection pressure and/or the advancing of the fuel injection timing, and then a reduction in the turbocharging pressure might be caused. When the turbocharging pressure is to be compensated for by, for example, a decrease in the opening degree of the nozzle vane and/or the bypass valve of the turbine of the variable capacity-type turbocharger in this case, the pump loss is exacerbated (increases) and both fuel economy and the acceleration performance might be exacerbated as a result thereof.

In this regard, even when the rotational speed of the engine is equal to or higher than the first rotational speed or the speed of the vehicle is equal to or higher than the first speed in a case where the center-of-gravity position of a heat generation rate is further on the retard side than the first crank angle as described above, the combustion control unit in the engine control device according to this aspect executes none of the increase in the fuel injection pressure and the advancing of the fuel injection timing when the accelerator opening degree of the engine exceeds the first opening degree and the absolute value of the increment in the torque attributable to the center-of-gravity position of a heat generation rate approaching the first crank angle because of the increase in the fuel injection pressure and/or the advancing of the fuel injection timing is determined to be less than the absolute value of the decrement in the torque attributable to the increase in the pump loss of the engine resulting from the compensation for the reduction in the turbocharging pressure resulting from the increase in the fuel injection pressure and/or the advancing of the fuel injection timing.

According to the engine control device of this aspect, none of the increase in the fuel injection pressure and the advancing of the fuel injection timing is executed in a case where it is determined that the decrement in the torque attributable to the increase in the pump loss resulting from the compensation for the reduction in the turbocharging pressure resulting from the increase in the fuel injection pressure and/or the advancing of the fuel injection timing exceeds the increment in the torque resulting from the advancing of the center-of-gravity position of a heat generation rate. As a result, fuel economy can be improved while the acceleration performance is ensured.

In the above, the accelerator opening degree of the engine can be detected based on, for example, a signal from a throttle valve opening degree sensor that detects the opening degree of a throttle valve. The first opening degree can be set to, for example, the lowest value of the accelerator opening degree assumed in the situation in which the acceleration of the vehicle or the like is required.

The decrement in the torque resulting from the increase in the fuel injection pressure and/or the advancing of the fuel injection timing can be calculated, for example, as follows. The amount of the reduction in the turbocharging pressure resulting from the increase in the fuel injection pressure and/or the advancing of the fuel injection timing ($\Delta$Pim) is calculated, and then the amount of a reduction in turbocharging efficiency resulting from a compensation for the calculated $\Delta$Pim based on, for example, a decrease in the opening degree of the nozzle vane and/or the bypass valve of the turbine of the variable capacity-type turbocharger or the like is calculated based on the turbocharging pressure, a turbine inlet pressure, the opening degree of the nozzle vane and/or the bypass valve, the amount of the intake air, or the like. Then, the decrement in the torque can be calculated based on the calculated turbocharging efficiency. The increment in the torque resulting from the advancing of the center-of-gravity position of a heat generation rate can be calculated based on, for example, the values of various combustion parameters at the new center-of-gravity position of a heat generation rate that is achieved as a result of the increase in the fuel injection pressure and/or the advancing of the fuel injection timing and the operating situations of the engine and the vehicle in which the engine is mounted (such as the engine rotational speed and the vehicle speed).

In the engine control device according to each of the above-described aspects of the invention, the center-of-gravity position of a heat generation rate is controlled such that the center-of-gravity position of a heat generation rate corresponds to the first crank angle by the combustion control unit executing at least one of the increase in the turbocharging pressure, the increase in the fuel injection pressure, and the advancing of the fuel injection timing in a case where the center-of-gravity position of a heat generation rate is further on the retard side than the first crank angle. In other words, the first crank angle can be set as an upper limit value of the center-of-gravity position of a heat generation rate which can be allowed.

As described above with reference to FIG. 2, the center-of-gravity position of a heat generation rate at which the fuel economy deterioration rate is minimized is a specific (fixed) crank angle θa (7° past the compression top dead center in the example illustrated in FIG. 2) even in a case where the engine rotational speed and the engine load vary and it has been found that the fuel economy deterioration rate becomes a substantially fixed value near the minimum value, even when the engine load and/or the engine rotational speed changes, insofar as the center-of-gravity position of a heat generation rate is near the crank angle θa. In other words, with a target center-of-gravity position of a heat generation rate (target center-of-gravity position) being specified as an allowable range that has an upper limit value and a lower limit value instead of one specific point, the combustion control unit may set the combustion parameter such that the actual center-of-gravity position of a heat generation rate is within the allowable range.

In a case where the actual center-of-gravity position of heat generation corresponds to a crank angle exceeding the upper limit value in the above (in a case where the center-of-gravity position of a heat generation rate is further on the retard side than the first crank angle), it is desirable that the center-of-gravity position of a heat generation rate is controlled such that the center-of-gravity position of a heat generation rate becomes the first crank angle or less by the combustion control unit changing the setting of at least one of the various combustion parameters as described above. In a case where the actual center-of-gravity position of heat generation is within the allowable range between the upper limit value and the lower limit value, the actual center-of-gravity position of heat generation does not have to be changed since a desired control result such as the minimization of fuel consumption is achieved in this case. In a case where the actual center-of-gravity position of heat generation corresponds to a crank angle lower than the lower limit value in the above (in a case where the center-of-gravity position of a heat generation rate is further on the advance side than a crank angle set as the lower limit value (corresponding to a second crank angle described later), it is desirable that the center-of-gravity position of a heat generation rate is controlled such that the center-of-gravity position of a heat generation rate becomes a crank angle corresponding to at least the lower limit value by the combustion control unit changing the setting of at least one of the various combustion parameters as described above.

In other words, in the engine control device according to a fourth aspect of the invention, which is based on the engine control device according to any one of the first to third aspects of the invention, the combustion control unit executes one or both of a decrease in the fuel injection pressure and retarding of the fuel injection timing in a case where the center-of-gravity position of a heat generation rate is further on the advance side than the second crank angle set further on the advance side than the first crank angle, and the combustion control unit changes none of the turbocharging pressure of the turbocharger, the fuel injection pressure, and the fuel injection timing in a case where the center-of-gravity position of a heat generation rate is the first crank angle or less and is at least the second crank angle.

In the above, the first crank angle can be set as the upper limit value of the center-of-gravity position of a heat generation rate that can be allowed as described above and the second crank angle can be set as the lower limit value of the center-of-gravity position of a heat generation rate that can be allowed. In other words, desired control results such as the minimization of fuel consumption are achieved in a case where the center-of-gravity position of a heat generation rate corresponds to the first crank angle or less and corresponds to at least the second crank angle (that is, in a case where the center-of-gravity position of a heat generation rate is within the allowable range). Accordingly, in a case where the actual center-of-gravity position of heat generation is within the allowable range, the combustion control unit in the engine control device according to this aspect changes none of the turbocharging pressure of the turbocharger, the fuel injection pressure, and the fuel injection timing. As a result, the center-of-gravity position of heat generation is not changed, and a state where the desired control results are achieved is maintained. In addition, although the possibility of hunting of the center-of-gravity position of heat generation is high at, for example, the upper limit of the value of the one specific point in a case where the value of the one specific point is set as the target center-of-gravity position of a heat generation rate (target center-of-gravity position), the presence of the allowable range of the target center-of-gravity position of a heat generation rate (target center-of-gravity position) allows the occurrence of the hunting to be suppressed and contributes to control stabilization.

In a case where the center-of-gravity position of a heat generation rate is on the advance side to excess, the exhaust gas loss is reduced and a reduction in the turbocharging pressure might be caused as described above. When the turbocharging pressure is to be compensated for by, for example, a decrease in the opening degree of the nozzle vane and/or the bypass valve of the turbine of the variable capacity-type turbocharger in this case, the pump loss is exacerbated (increases) and both fuel economy and the acceleration performance might be exacerbated as a result thereof. Accordingly, the combustion control unit in the engine control device according to this aspect retards the center-of-gravity position of a heat generation rate in a case where the center-of-gravity position of a heat generation rate is further on the advance side than the second crank angle set further on the advance side than the first crank angle. In this case, the combustion control unit executes one or both of the decrease in the fuel injection pressure and the retarding of the fuel injection timing. As described above, the injection system parameters such as the fuel injection timing and the fuel injection pressure are highly responsive during the correction and facilitate the calculation of the correction deviation. Accordingly, it is desirable that the injection system parameter is used as the parameter controlling the center-of-gravity position of a heat generation rate in that the center-of-gravity position of a heat generation rate on the advance side to excess is quickly retarded to be kept within the allowable range.

According to the engine control device of this aspect, the center-of-gravity position of a heat generation rate is quickly retarded to be kept within the allowable range while the occurrence of the hunting or the like is suppressed as described above. Accordingly, the desired control results such as the minimization of fuel consumption can be achieved.

The center-of-gravity position of a heat generation rate can be defined by various methods as described above. Specifically, the center-of-gravity position of a heat generation rate can be defined by any of Definitions 1, 2, 3, 3', 4, and 5 described above. As a matter of course, the engine control device that performs the control of the center-of-gravity position of a heat generation rate based on the center-of-gravity position of a heat generation rate which is defined by these various definitions is also included in the aspects of the invention. Examples of the aspects of the invention using the center-of-gravity position of a heat generation rate defined by Definitions 1, 2, 3, 3', 4, and 5 described above will be described below. The description of the definition of the center-of-gravity position of a heat generation rate will be omitted below since it has already been described in detail.

In the engine control device according to a fifth aspect of the invention, which is based on the engine control device according to any one of the first to fourth aspects of the invention, the center-of-gravity position of a heat generation rate is a crank angle corresponding to a geometric center of gravity of a region surrounded by a waveform of the heat generation rate drawn in a graph in which a crank angle of a single combustion stroke is set on one axis and the heat generation rate is set on the other axis orthogonal to the one axis and the one axis.

In the engine control device according to a sixth aspect of the invention, which is based on the engine control device according to any one of the first to fourth aspects of the invention, the center-of-gravity position of a heat generation rate is a specific crank angle at which areas of two regions divided from each other by the specific crank angle are equal to each other when a region surrounded by a waveform of the heat generation rate drawn in a graph in which a crank angle of a single combustion stroke is set on one axis and the heat generation rate is set on the other axis orthogonal to the one axis and the one axis is divided by the specific crank angle.

In the engine control device according to a seventh aspect of the invention, which is based on the engine control device according to any one of the first to fourth aspects of the invention, the center-of-gravity position of a heat generation rate is a specific crank angle between combustion initiation and combustion termination of a single combustion stroke at which a value obtained by integrating a product of a "magnitude of a difference between an arbitrary first crank angle between the combustion initiation and the specific crank angle and the specific crank angle" and the "heat generation rate at the arbitrary first crank angle" with respect to a crank angle from the combustion initiation to the specific crank angle is equal to a value obtained by integrating a product of a "magnitude of a difference between an arbitrary second crank angle between the specific crank angle and the combustion termination and the specific crank angle" and the "heat generation rate at the arbitrary second crank angle" with respect to a crank angle from the specific crank angle to the combustion termination.

In the engine control device according to an eighth aspect of the invention, which is based on the engine control device according to any one of the first to fourth aspects of the invention, the center-of-gravity position of a heat generation rate is a specific crank angle between combustion initiation and combustion termination of a single combustion stroke at which a value obtained by integrating a value corresponding to a product of a value obtained by subtracting the specific crank angle from an arbitrary crank angle and the heat generation rate at the arbitrary crank angle with respect to a crank angle from the combustion initiation to the combustion termination becomes "0".

In the engine control device according to a ninth aspect of the invention, which is based on the engine control device according to any one of the first to fourth aspects of the invention, the center-of-gravity position of a heat generation rate is a value obtained by adding a combustion initiation crank angle to a value obtained by dividing an integral value of a product of a value obtained by subtracting the combustion initiation crank angle from an arbitrary crank angle of a single combustion stroke and the heat generation rate at the arbitrary crank angle by an area of a region defined by a waveform of the heat generation rate with respect to a crank angle.

In the engine control device according to a tenth aspect of the invention, which is based on the engine control device according to any one of the first to fourth aspects of the invention, the center-of-gravity position of a heat generation rate is a crank angle obtained by a calculation based on the following Equation (3).

$$Gc = \frac{\int_{CAs}^{CAe} (\theta - CAs) dQ(\theta) d\theta}{\int_{CAs}^{CAe} dQ(\theta) d\theta} + CAs \qquad (3)$$

In this equation, Gc is the center-of-gravity position of a heat generation rate, CAs is a combustion initiation crank angle as a crank angle at which the combustion of the fuel begins, CAe is a combustion termination crank angle as a crank angle at which the combustion terminates, $\theta$ is an arbitrary crank angle, and $dQ(\theta)$ is the heat generation rate at the crank angle $\theta$.

In the engine control device according to each of these aspects, the parameters used for the control of the center-of-gravity position of a heat generation rate are properly used depending on the operating situations of the engine and the vehicle in which the engine is mounted, and thus fuel economy can be improved by the center-of-gravity position of a heat generation rate being maintained at a predetermined fixed value regardless of the load of the engine and/or the engine rotational speed while an increase in the noise and vibration which the user feels uncomfortable with is suppressed.

Hereinafter, the engine control device according to several aspects of the invention will be described in more detail. The following description is for the purpose of exemplification only, and the scope of the invention should not be interpreted to be limited to the following description.

Embodiment 1

First Embodiment

An engine control device according to a first embodiment of the invention (hereinafter, also referred to as a "first device") will be described below with reference to accompanying drawings.

(Configuration)

Figure 3:
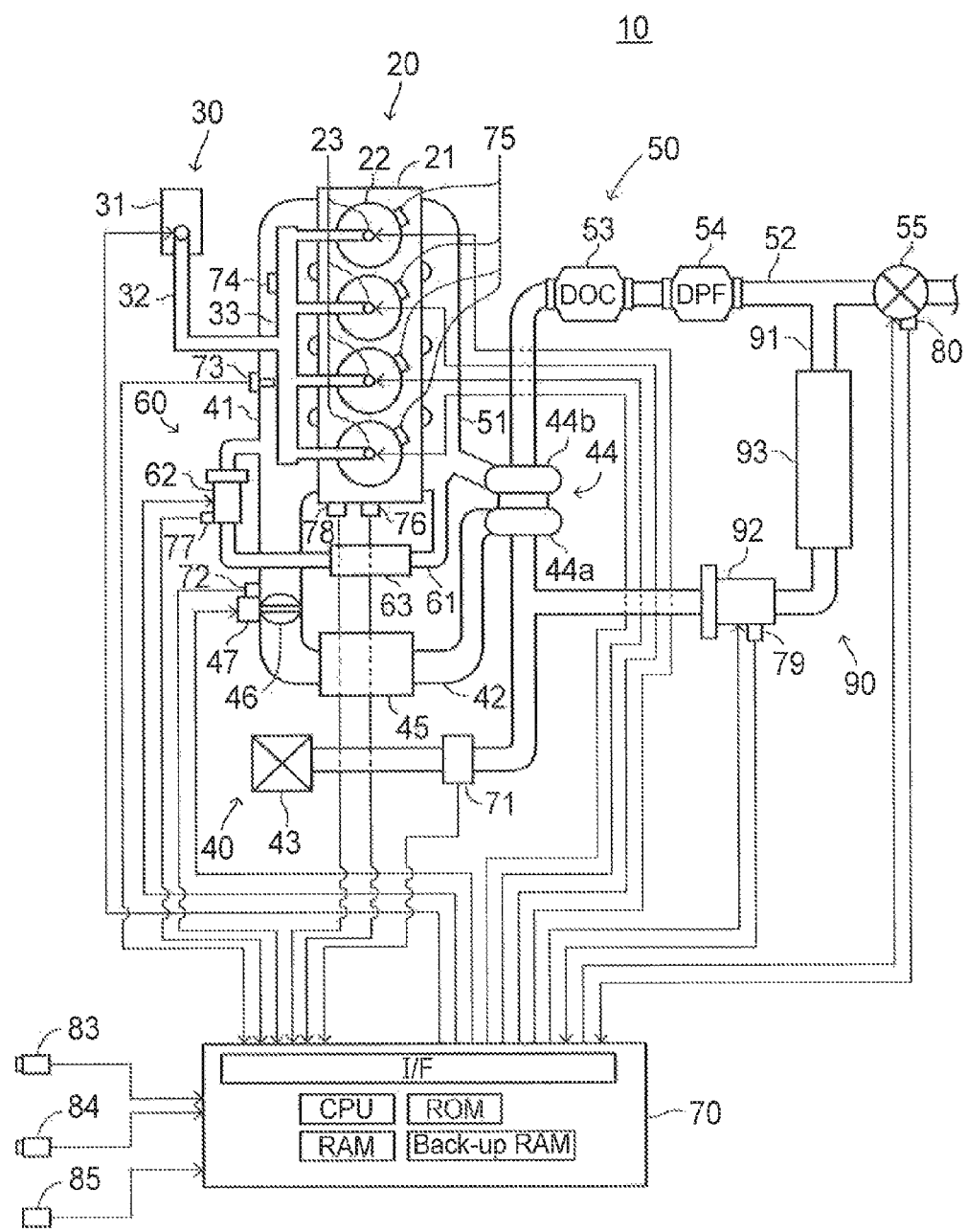
FIG. 3 is a schematic configuration diagram of an engine control device according to a first embodiment of the invention and an internal combustion engine to which the engine control device is applied.

The first device is applied to an internal combustion engine (engine) 10 that is illustrated in FIG. 3. The engine 10 is a multi-cylinder (series four-cylinder in this example), four-cycle, and piston-reciprocating diesel engine. The engine 10 includes an engine main body portion 20, a fuel supply system 30, an intake system 40, an exhaust system 50, a high-pressure EGR system 60, and a low-pressure EGR system 90.

An engine main body portion 20 is provided with a main body 21 that includes a cylinder block, a cylinder head, a crankcase, and the like. Four cylinders (combustion chambers) 22 are formed in the main body 21. Fuel injection valves (injectors) 23 are arranged in upper portions of the respective cylinders 22. The fuel injection valves 23 are opened in response to an instruction from an engine electronic control unit (ECU) 70 (described later) and inject fuel directly into the cylinders.

The fuel supply system 30 includes a fuel pressure pump (supply pump) 31, a fuel delivery tube 32, and a common rail (accumulator) 33. A discharge port of the fuel pressure pump 31 is connected to the fuel delivery tube 32. The fuel delivery tube 32 is connected to the common rail 33. The common rail 33 is connected to the fuel injection valves 23.

The fuel pressure pump 31 pressurizes the fuel after pumping up the fuel that is stored in a fuel tank (not illustrated). Then, the fuel pressure pump 31 supplies the pressurized high-pressure fuel to the common rail 33 through the fuel delivery tube 32. The fuel pressure pump 31 is operated by a driving shaft that works in tandem with a crankshaft of the engine 10. The fuel pressure pump 31 can adjust the pressure of the fuel inside the common rail 33 (that is, fuel injection pressure, common rail pressure) in response to an instruction from the electronic control unit 70.

The intake system 40 includes an intake manifold 41, an intake pipe 42, an air cleaner 43, a compressor 44a of a turbocharger 44, an intercooler 45, a throttle valve 46, and a throttle valve actuator 47.

The intake manifold 41 includes branch portions that are connected to the respective cylinders and a collecting portion where the branch portions are collected. The intake pipe 42 is connected to the collecting portion of the intake manifold 41. The intake manifold 41 and the intake pipe 42 constitute an intake passage. In the intake pipe 42, the air cleaner 43, the compressor 44a of the turbocharger 44, the intercooler 45, and the throttle valve 46 are arranged in this order from the upstream side toward the downstream side of the flow of suctioned air. The throttle valve actuator 47 changes the opening degree of the throttle valve 46 in response to an instruction from the electronic control unit 70.

The exhaust system 50 includes an exhaust manifold 51, an exhaust pipe 52, a turbine 44b of the turbocharger 44, a diesel oxidation catalyst (DOC) 53, a diesel particulate filter (DPF) 54, and an exhaust throttle valve 55.

The exhaust manifold 51 includes branch portions that are connected to the respective cylinders and a collecting portion where the branch portions are collected. The exhaust pipe 52 is connected to the collecting portion of the exhaust manifold 51. The exhaust manifold 51 and the exhaust pipe 52 constitute an exhaust passage. In the exhaust pipe 52, the turbine 44b of the turbocharger 44, the DOC 53, the DPF 54, and the exhaust throttle valve 55 are arranged in this order from the upstream side toward the downstream side of the flow of exhaust gas.

The turbocharger 44 is a known variable capacity-type turbocharger. A plurality of nozzle vanes (variable nozzles, not illustrated) are disposed in the turbine 44b of the turbocharger 44. The turbine 44b is provided with "a bypass passage of the turbine 44b and a bypass valve disposed in the bypass passage" (not illustrated). The opening degrees of the nozzle vanes and the bypass valve change in response to an instruction from the electronic control unit 70. As a result, a turbocharging pressure is changed (controlled). In other words, "controlling the turbocharger 44" according to this specification means changing the turbocharging pressure by changing the angle of the nozzle vane and/or the opening degree of the bypass valve.

The DOC 53 oxidizes unburned gas (HC, CO) in the exhaust gas. In other words, HC is oxidized into water and $CO_2$ and CO is oxidized into $CO_2$ by the DOC 53. In addition, NO in NOx is oxidized into $NO_2$ by the DOC 53.

The DPF 54 collects carbon-based soot and a particulate matter (PM) including an organic matter attached thereto. The collected carbon is oxidized by $NO_2$ that flows into the DPF 54 and is changed into $CO_2$ and NO.

The opening degree of the exhaust throttle valve 55 changes in response to an instruction from the electronic control unit 70, which results in a change (adjustment) in exhaust gas pressure. Then, the turbocharging pressure of the turbocharger 44 or the like is changed (controlled).

The high-pressure EGR system 60 includes a high-pressure exhaust gas recirculation pipe 61, a high-pressure EGR control valve 62, and a high-pressure EGR cooler 63. The high-pressure exhaust gas recirculation pipe 61 allows a position of the exhaust passage (exhaust manifold 51) on the upstream side of the turbine 44b to communicate with a position of the intake passage (intake manifold 41) on the downstream side of the throttle valve 46. The high-pressure exhaust gas recirculation pipe 61 constitutes a high-pressure EGR gas passage. The high-pressure EGR control valve 62 is arranged in the high-pressure exhaust gas recirculation pipe 61. The high-pressure EGR control valve 62 can change the amount of the exhaust gas recirculating from the exhaust passage to the intake passage (the amount of high-pressure EGR gas) by changing the passage cross-sectional area of the high-pressure EGR gas passage in response to an instruction from the electronic control unit 70.

The low-pressure EGR system 90 includes a low-pressure exhaust gas recirculation pipe 91, a low-pressure EGR control valve 92, and a low-pressure EGR cooler 93. The low-pressure exhaust gas recirculation pipe 91 allows a position of the exhaust passage (exhaust pipe 52) on the downstream side of the DPF 54 to communicate with a position of the intake passage (intake pipe 42) on the upstream side of the compressor 44*a* of the turbocharger 44. The low-pressure exhaust gas recirculation pipe 91 constitutes a low-pressure EGR gas passage. The low-pressure EGR control valve 92 is arranged in the low-pressure exhaust gas recirculation pipe 91. The low-pressure EGR control valve 92 can change the amount of the exhaust gas recirculating from the exhaust passage to the intake passage (the amount of low-pressure EGR gas) by changing the passage cross-sectional area of the low-pressure EGR gas passage in response to an instruction from the electronic control unit 70.

The electronic control unit 70 is an electronic circuit including a known microcomputer. The electronic control unit 70 includes a CPU, a ROM, a RAM, a backup RAM, an interface, and the like. The electronic control unit 70 is connected to sensors described below and receives (is input with) signals from these sensors. In addition, the electronic control unit 70 sends instruction (driving) signals to various actuators in response to an instruction from the CPU.

The electronic control unit 70 is connected to an air flow meter 71, a throttle valve opening degree sensor 72, an intake pipe pressure sensor 73, a fuel pressure sensor 74, in-cylinder pressure sensors 75, a crank angle sensor 76, a high-pressure EGR control valve opening degree sensor 77, a water temperature sensor 78, a low-pressure EGR control valve opening degree sensor 79, and an exhaust throttle valve opening degree sensor 80.

The air flow meter 71 measures the mass flow rate of the suctioned air that flows through the intake passage (fresh air containing no EGR gas) and outputs a signal which represents the mass flow rate (hereinafter, referred to as a "suctioned air amount Ga"). In addition, the air flow meter 71 detects the temperature of the suctioned air and outputs a signal which represents the intake temperature THA.

The throttle valve opening degree sensor 72 detects a throttle valve opening degree and outputs a signal which represents the throttle valve opening degree TA.

The intake pipe pressure sensor 73 outputs a signal which represents the pressure (intake pipe pressure) Pim of gas inside the intake pipe that is on the downstream side of the throttle valve 46 in the intake passage. It can be said that the intake pipe pressure Pim is the turbocharging pressure.

The fuel pressure sensor 74 detects the pressure of the fuel in the common rail 33 (fuel pressure, fuel injection pressure, common rail pressure) and outputs a signal which represents the fuel injection pressure Pcr.

The in-cylinder pressure sensors 75 are arranged to be correlated with the respective cylinders (combustion chambers). The in-cylinder pressure sensor 75 detects the pressure inside the correlated cylinder (that is, in-cylinder pressure) and outputs a signal which represents the in-cylinder pressure Pcy.

The crank angle sensor 76 outputs a signal correlated with the rotational position (that is, crank angle) of the crankshaft (not illustrated) of the engine 10. The electronic control unit 70 acquires the crank angle (absolute crank angle) θ of the engine 10, which has the compression top dead center of a predetermined cylinder as a reference, based on the signal from the crank angle sensor 76 and a signal from a cam position sensor (not illustrated). In addition, the electronic control unit 70 acquires an engine rotational speed Ne based on the signal from the crank angle sensor 76.

The high-pressure EGR control valve opening degree sensor 77 detects the opening degree of the high-pressure EGR control valve 62 and outputs a signal Vegrh which represents the opening degree.

The low-pressure EGR control valve opening degree sensor 79 detects the opening degree of the low-pressure EGR control valve 92 and outputs a signal Vegrl which represents the opening degree.

The water temperature sensor 78 detects the temperature of cooling water for the engine 10 (cooling water temperature) and outputs a signal which represents the cooling water temperature THAW.

The electronic control unit 70 is connected to an accelerator opening degree sensor 83, a vehicle speed sensor 84, and a remaining fuel amount sensor 85.

The accelerator opening degree sensor 83 detects the opening degree (accelerator pedal operation amount) of an accelerator pedal (not illustrated) and outputs a signal which represents the accelerator pedal opening degree Accp.

The vehicle speed sensor 84 detects the traveling speed of a vehicle in which the engine 10 is mounted and outputs a signal which represents the traveling speed (vehicle speed) Spd.

The remaining fuel amount sensor 85 detects the amount of the fuel that is stored in the fuel tank (not illustrated), that is, a remaining fuel amount, and outputs a signal Fr which represents the remaining amount.

(Control Overview)

The overview of an operation of the first device will be described below. The first device performs combustion control (that is, sets a combustion parameter) so that the center-of-gravity position of a heat generation rate defined by any of Definitions 1, 2, 3 3', 4, and 5 above corresponds to a predetermined target center-of-gravity position of a heat generation rate (hereinafter, simply referred to as a "target center-of-gravity position" in some cases). The target center-of-gravity position of a heat generation rate is also referred to as a target center-of-gravity angle of a heat generation rate or a target crank angle. The center-of-gravity position of a heat generation rate corresponds to the same crank angle for any of Definitions 1, 2, 3, 3', 4, and 5 above insofar as the combustion waveform remains unchanged.

In the first device, the combustion parameter is determined in advance and is stored in the ROM with respect to operation states of the engine (such as the load of the engine and the engine rotational speed) so that the center-of-gravity position of a heat generation rate corresponds to the target center-of-gravity position. The first device reads the combustion parameter from the ROM depending on the actual operation states of the engine and allows the center-of-gravity position of a heat generation rate to correspond to the target center-of-gravity position by control using the combustion parameter (that is, feedforward control). In addition, the first device estimates the actual center-of-gravity position of a heat generation rate based on the in-cylinder pressure Pcy detected by the in-cylinder pressure sensors 75 and feedback-controls the combustion parameter so that the estimated center-of-gravity position of a heat generation rate corresponds to the target center-of-gravity position. However, the feedback control described above is optional. The center-of-gravity position of a heat generation rate may be allowed to correspond to the target center-of-gravity position by feedback control alone without the execution of the feedforward control.

During this control, fuel economy can be improved by the combustion parameters such as the fuel injection timing, the fuel injection pressure, the amount of the fuel injected by the pilot injection, and the turbocharging pressure being used as the parameters controlling the center-of-gravity position of a heat generation rate, the center-of-gravity position of a heat generation rate being maintained at a predetermined fixed value (target center-of-gravity position) regardless of the load of the engine and/or the engine rotational speed, and the combustion state of the engine being maintained in a specific state as described above. At least one of the above-described (1) to (13) can be adopted as an example of these combustion parameters. The setting of these combustion parameters pertaining to a case where the center-of-gravity position of a heat generation rate Gc is advanced or retarded is as described above.

Parameters relating to fuel injection such as the fuel injection timing and the fuel injection pressure (injection system parameters) among these combustion parameters are highly responsive during the correction as described above, and thus the deviation (correction deviation) of the center-of-gravity position of a heat generation rate resulting from the correction is easily calculated. In this regard, it is desirable that the injection system parameters are used as the parameters controlling the center-of-gravity position of a heat generation rate.

In a case where the center-of-gravity position of a heat generation rate is controlled by the use of the injection system parameters as described above, however, the amount of change per unit crank angle in the pressure inside the combustion chamber (in-cylinder pressure) increases and the effects on the noise and vibration resulting from the combustion such as the combustion noise increase. As a result, the user (such as the driver) or the like of the vehicle in which the engine is mounted as a power source might feel uncomfortable therewith. In a case where the rotational speed of the engine and the speed of the vehicle in which the engine is mounted are low in particular, the levels of the noise and vibration that occur when the engine and the vehicle are in operation are low, and thus the change in the noise and vibration resulting from the combustion of the fuel tends to be easily sensed by the user.

As described above, it is important that the acceleration performance is ensured for a high level of drivability to be maintained in a situation in which the speed of the vehicle is assumed to be increased (accelerated) in the future, examples of which include a case where the rotational speed of the engine and the speed of the vehicle in which the engine is mounted are low. In a case where the center-of-gravity position of a heat generation rate is advanced by, for example, an increase in the fuel injection pressure and/or the advancing of the fuel injection timing, however, the exhaust gas loss is reduced due to the increase in the fuel injection pressure and/or the advancing of the fuel injection timing, and then a reduction in the turbocharging pressure might be caused. When the turbocharging pressure is to be compensated for by, for example, a decrease in the opening degree of the nozzle vane and/or the bypass valve of the turbine 44b of the variable capacity-type turbocharger 44 in this case, the pump loss is exacerbated (increases) and both fuel economy and the acceleration performance might be exacerbated as a result thereof.

Accordingly, when fuel economy is to be improved with the center-of-gravity position of a heat generation rate being maintained at a predetermined fixed value in a case where the rotational speed of the engine is lower than the first rotational speed and the speed of the vehicle in which the engine is mounted is lower than the first speed, it is desirable that the center of gravity of a heat generation rate is controlled by the use of a combustion parameter less likely to cause an increase in the noise and vibration which the user feels uncomfortable with and the deterioration of the acceleration performance. Specific examples of this combustion parameter can include the turbocharging pressure of the turbocharger.

In a case where the rotational speed of the engine or the speed of the vehicle in which the engine is mounted are high, the level of the noise and/or vibration that occurs when the engine and the vehicle are in operation is high, and thus the change in the noise and vibration resulting from the combustion of the fuel tends to be less likely to be sensed by the user. Accordingly, in this case, it is desirable that the center of gravity of a heat generation rate is controlled by the use of a combustion parameter highly responsive during the correction and facilitating the calculation of the deviation (correction deviation) of the center-of-gravity position of a heat generation rate resulting from the correction as described above. Specific examples of this combustion parameter can include the parameters relating to fuel injection such as the fuel injection timing and the fuel injection pressure (injection system parameters).

In the first device, the combustion control unit executes an increase in the turbocharging pressure of the turbocharger when the rotational speed of the engine is lower than the first rotational speed and the speed of the vehicle in which the engine is mounted is lower than the first speed in a case where the center-of-gravity position of a heat generation rate is further on the retard side than the first crank angle, and the combustion control unit executes one or both of an increase in the fuel injection pressure and the advancing of the fuel injection timing when the rotational speed of the engine is equal to or higher than the first rotational speed or the speed of the vehicle is equal to or higher than the first speed in the case where the center-of-gravity position of a heat generation rate is further on the retard side than the first crank angle.

According to the above, the center of gravity of a heat generation rate is controlled by the turbocharging pressure, which is a combustion parameter less likely to cause an increase in the noise and vibration which the user feels uncomfortable with, in a case where the rotational speed of the engine and the speed of the vehicle in which the engine is mounted are low although the change in the noise and vibration resulting from the combustion of the fuel is easily sensed by the user in this case. Accordingly, the acceleration performance can be ensured while an increase in the noise and vibration which the user feels uncomfortable with is suppressed. The center of gravity of a heat generation rate is controlled by the injection system parameter, which is a combustion parameter highly responsive during the correction and facilitating the calculation of the correction deviation, in a case where the rotational speed of the engine or the speed of the vehicle in which the engine is mounted is high. As described above, the first device properly uses the parameters used for the control of the center-of-gravity position of a heat generation rate depending on the operating situations of the engine and the vehicle in which the engine is mounted, and thus can improve fuel economy by maintaining the center-of-gravity position of a heat generation rate at a predetermined fixed value regardless of the load of the engine and/or the engine rotational speed while suppressing an increase in the noise and vibration which the user feels uncomfortable with.

(Actual Operation)

Figure 4:
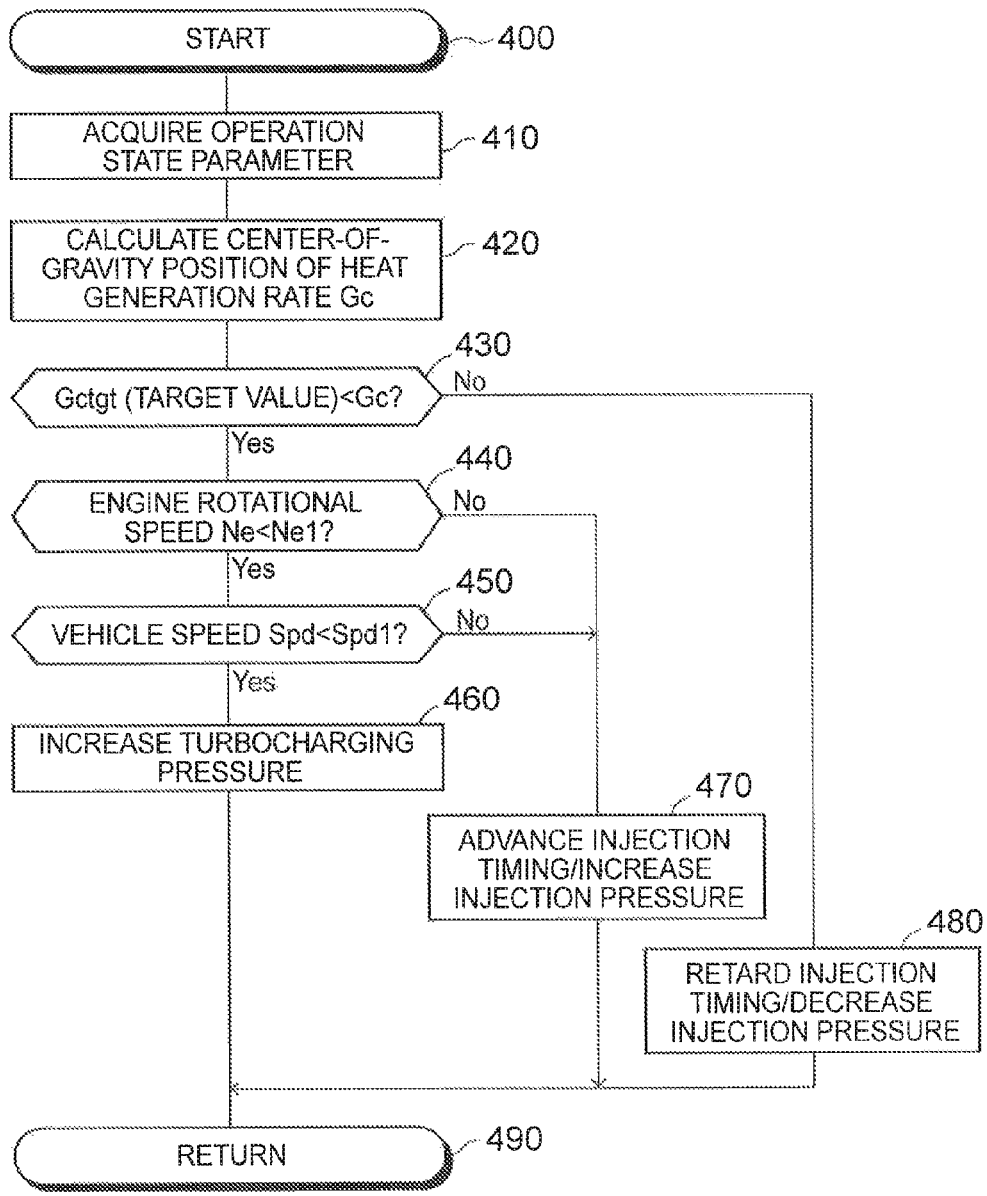
FIG. 4 is a flowchart illustrating a routine that is executed by a CPU of the control device which is illustrated in FIG. 3.

Processing that is actually performed by the CPU of the electronic control unit 70 (hereinafter, simply referred to as the "CPU") will be described below. Herein, the feedback control of the center-of-gravity position of a heat generation rate will be described. The CPU executes the routine that is illustrated in the flowchart of FIG. 4 whenever a predetermined period of time elapses. Through this routine, the combustion parameter is feedback-controlled and adjusted so that the actual center-of-gravity position of a heat generation rate Gc corresponds to the target center-of-gravity position Gctgt. In this case, the parameters used for the control of the center-of-gravity position of a heat generation rate are properly used depending on the operating situations of the engine and the vehicle in which the engine is mounted. This routine is executed for each of the cylinders of the engine 10.

At an opportune time, the CPU initiates the processing from Step 400 in FIG. 4. Then, the processing proceeds to Step 410 and the CPU acquires various operation state parameters from the above-described sensors and the like. Then, the processing proceeds to Step 420 in FIG. 4, and the CPU calculates the actual center-of-gravity position of a heat generation rate Gc based on the heat generation rate as the amount per unit crank angle of the heat generated by combustion of the fuel.

Specifically, the CPU calculates the heat generation rate $dQ(\theta)$ [J/degATDC], which is a heating value per unit crank angle with respect to the crank angle $\theta$ [degATDC], based on the in-cylinder pressure Pcy and a known method (for example, refer to Japanese Patent Application Publication No. 2005-54753 and Japanese Patent Application Publication No. 2007-285194).

Then, the CPU acquires and estimates the center-of-gravity position of a heat generation rate Gc based on any of the above-described Definitions 1, 2, 3, 3', 4, and 5. Herein, the CPU acquires and estimates the center-of-gravity position of a heat generation rate Gc by applying the heat generation rate $dQ(\theta)$ to the following Equation (3). In actuality, the center-of-gravity position of a heat generation rate Gc is calculated based on Equation (3) converted into a digital arithmetic expression. In Equation (3), CAs is the crank angle at which the combustion begins and CAe is the crank angle at which the combustion terminates.

$$Gc = \frac{\int_{CAs}^{CAe} (\theta - CAs) dQ(\theta) d\theta}{\int_{CAs}^{CAe} dQ(\theta) d\theta} + CAs \quad (3)$$

Then, the processing proceeds to Step 430, and the CPU determines whether or not the calculated actual center-of-gravity position of a heat generation rate Gc exceeds the target center-of-gravity position of a heat generation rate Gctgt (first crank angle) determined in advance (whether or not Gc is further on the retard side than Gctgt).

In a case where it is determined that the actual center-of-gravity position of a heat generation rate Gc does not exceed the target center-of-gravity position of a heat generation rate Gctgt (first crank angle) as a result of the determination in Step 430 (Step 430: No), that is, in a case where Gc corresponds to Gctgt or is further on the advance side than the Gctgt, the processing proceeds to Step 480 and the CPU retards the actual center-of-gravity position of a heat generation rate Gc by executing one or both of a decrease in the fuel injection pressure and the retarding of the fuel injection timing. Then, the processing proceeds to Step 490 and the CPU temporarily terminates this routine. The retarding of the center-of-gravity position of a heat generation rate Gc in Step 480 is optional. In a case where it is determined that the actual center-of-gravity position of a heat generation rate Gc exceeds the target center-of-gravity position of a heat generation rate Gctgt (first crank angle) as a result of the determination in Step 430 (Step 430: Yes), that is, in a case where Gc is further on the retard side than the Gctgt, the processing proceeds to Step 440 and the CPU determines whether or not the engine rotational speed Ne is lower than a first rotational speed Ne1 determined in advance.

In a case where it is determined in Step 440 that the engine rotational speed Ne is equal to or higher than the first rotational speed Ne1 (Step 440: No), the processing proceeds to Step 470 and the CPU advances the actual center-of-gravity position of a heat generation rate Gc by executing one or both of an increase in the fuel injection pressure and the advancing of the fuel injection timing. In this case, the engine rotational speed Ne is high and the level of the noise and/or vibration resulting from the operation of the engine is high. Accordingly, the change in the noise and vibration resulting from the combustion of the fuel is less likely to be sensed by the user even when the center-of-gravity position of a heat generation rate Gc is controlled by the use of the injection system parameter as described above and the possibility of the user's discomfort is reduced. The processing proceeds to Step 490 thereafter, and the CPU temporarily terminates this routine. In a case where it is determined in Step 440 that the engine rotational speed Ne is lower than the first rotational speed Ne1 (Step 440: Yes), the processing proceeds to Step 450 and the CPU determines whether or not the traveling speed (vehicle speed) Spd of the vehicle in which the engine is mounted is lower than a first speed Spd1 determined in advance.

In a case where it is determined in Step 450 that the vehicle speed Spd is equal to or higher than the first speed Spd1 (Step 450: No), the processing proceeds to Step 470 and the CPU executes one or both of an increase in the fuel injection pressure and the advancing of the fuel injection timing. In a case where it is determined in Step 450 that the vehicle speed Spd is lower than the first speed Spd1 (Step 450: Yes), the processing proceeds to Step 460 and the CPU increases the turbocharging pressure of the turbocharger. In this case, both the engine rotational speed Ne and the vehicle speed Spd are low and the levels of the noise and vibration resulting from the operation of the engine are low. Accordingly, when the center-of-gravity position of a heat generation rate Gc is controlled by the use of the injection system parameter in this case as described above, the change in the noise and vibration resulting from the combustion of the fuel is likely to be sensed by the user and the possibility of the user's discomfort increases. However, in Step 460, the actual center-of-gravity position of a heat generation rate Gc is advanced based on the increase in the turbocharging pressure of the turbocharger. As a result, the actual center-of-gravity position of a heat generation rate Gc can be controlled to approach the target center-of-gravity position of a heat generation rate Gctgt (first crank angle) while an increase in the noise and vibration which the user feels uncomfortable with is suppressed and the acceleration performance is ensured. The processing proceeds to Step 490 thereafter, and the CPU temporarily terminates this routine.

As described above, the first device is provided with the combustion control unit setting the combustion parameter as a combustion state parameter for the fuel supplied to the cylinders of the engine provided with the turbocharger. In the engine control device, the combustion control unit sets the combustion parameter such that the center-of-gravity position of a heat generation rate determined by the heat generation rate as the amount per unit crank angle of the heat generated by the combustion of the fuel corresponds to the first crank angle when the load of the engine is within the specific load range between at least the first threshold and the second threshold exceeding the first threshold.

In addition, the combustion control unit executes the increase in the turbocharging pressure of the turbocharger when the rotational speed of the engine is lower than the first rotational speed and the speed of a vehicle in which the engine is mounted is lower than the first speed in a case where the center-of-gravity position of a heat generation rate is further on the retard side than the first crank angle, and executes one or both of the increase in the fuel injection pressure and the advancing of the fuel injection timing when the rotational speed of the engine is equal to or higher than the first rotational speed or the speed of the vehicle is equal to or higher than the first speed in the case where the center-of-gravity position of a heat generation rate is further on the retard side than the first crank angle.

According to the above, the center of gravity of a heat generation rate is controlled by the turbocharging pressure, which is a combustion parameter less likely to cause an increase in the noise and vibration which the user feels uncomfortable with, in a case where the rotational speed of the engine and the speed of the vehicle in which the engine is mounted are low although the change in the noise and vibration resulting from the combustion of the fuel is easily sensed by the user in this case. Accordingly, the acceleration performance can be ensured while an increase in the noise and vibration which the user feels uncomfortable with is suppressed. The center of gravity of a heat generation rate is controlled by the injection system parameter, which is a combustion parameter highly responsive during the correction and facilitating the calculation of the correction deviation, in a case where the rotational speed of the engine or the speed of the vehicle in which the engine is mounted is high. As described above, the first device properly uses the parameters used for the control of the center-of-gravity position of a heat generation rate depending on the operating situations of the engine and the vehicle in which the engine is mounted, and thus can improve fuel economy by maintaining the center-of-gravity position of a heat generation rate at a predetermined fixed value regardless of the load of the engine and/or the engine rotational speed while suppressing an increase in the noise and vibration which the user feels uncomfortable with.

Embodiment 2

Second Embodiment

Figure 5:
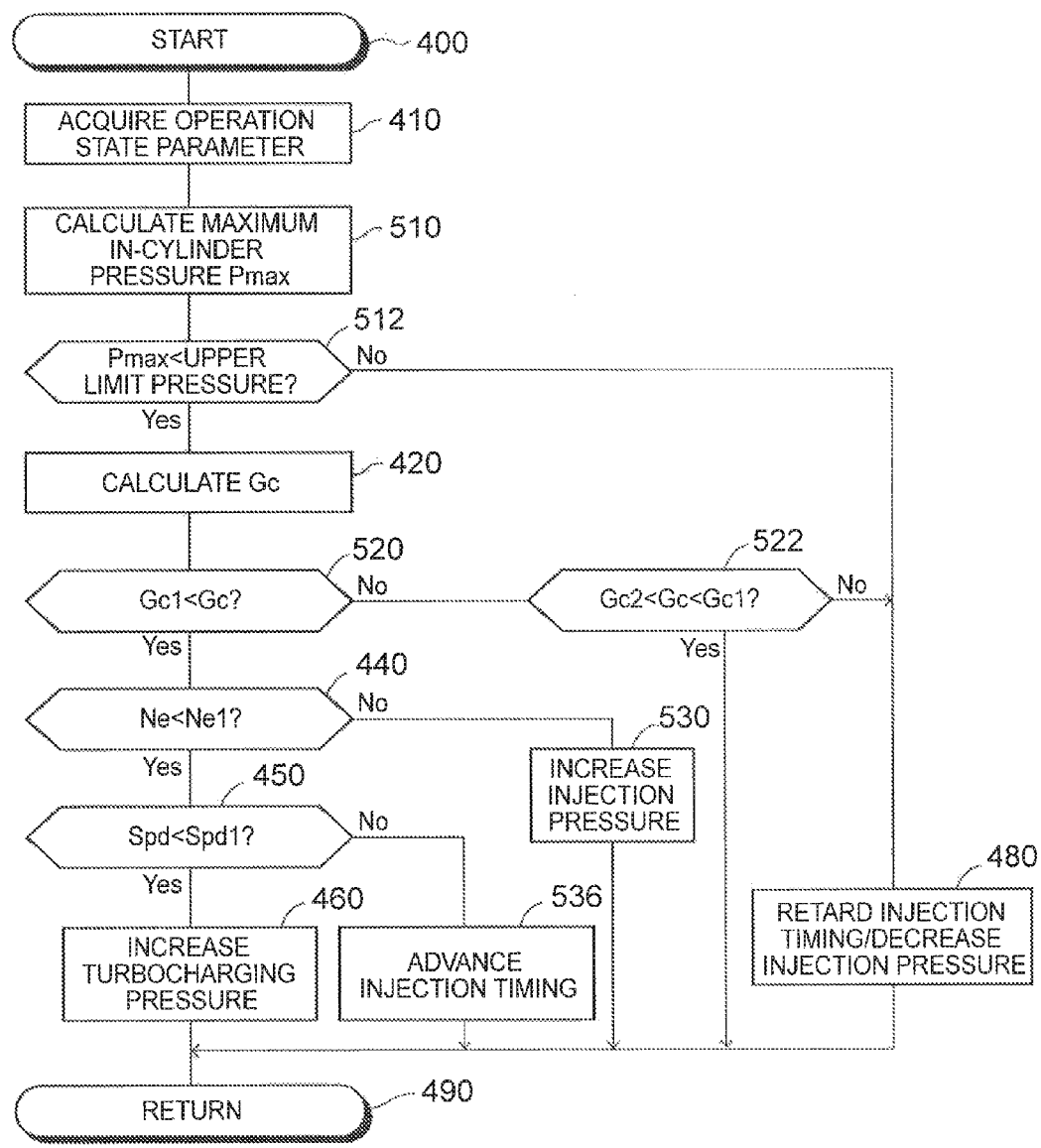
FIG. 5 is a flowchart illustrating the routine that is executed by the CPU of the control device which is illustrated in FIG. 3.

An engine control device according to a second embodiment of the invention (hereinafter, also referred to as a "second device") will be described below. The second device differs from the first device only in that the CPU of the electronic control unit 70 of the second device executes the "routine that is illustrated in FIG. 5" instead of the "routine that is illustrated in FIG. 4". The following description will focus on this difference.

In the routine that is illustrated in FIG. 5, Step 520 (corresponding to Step 430 in FIG. 4) for a comparison between the center-of-gravity position of a heat generation rate Gc and (an upper limit value Gc1 of) the target center-of-gravity position of a heat generation rate is preceded by Step 510, in which a maximum in-cylinder pressure (Pmax) is calculated based on, for example, the operating situations of the engine and the vehicle at that point in time and set values of various combustion parameters. Then, in Step 512, it is determined whether or not this calculated Pmax is kept below the highest in-cylinder pressure (upper limit pressure) as the upper limit value applied to the design of the in-cylinder pressure of the engine. In a case where Pmax is equal to or higher than the upper limit pressure (Pmax≥upper limit pressure), the processing proceeds to Step 480 and the CPU retards the actual center-of-gravity position of a heat generation rate Gc by executing one or both of a decrease in the fuel injection pressure and the retarding of the fuel injection timing as in the routine that is illustrated in FIG. 4. Then, the processing proceeds to Step 490 and the CPU temporarily terminates this routine. In this manner, the second device can control the in-cylinder pressure not to exceed the designed upper limit value of the engine.

In the routine that is illustrated in FIG. 4, the combustion parameter is set so that the center-of-gravity position of a heat generation rate Gc approaches the target center-of-gravity position of a heat generation rate Gctgt. In the routine that is illustrated in FIG. 5, in contrast, the combustion parameter is set such that the center-of-gravity position of a heat generation rate Gc is within an allowable range of the target center-of-gravity position of a heat generation rate. More Specifically, the second device that executes the routine illustrated in FIG. 5 calculates the center-of-gravity position of a heat generation rate Gc in Step 420 as in the routine illustrated in FIG. 4. However, in the subsequent Step 520, it is determined whether or not the center-of-gravity position of a heat generation rate Gc exceeds the upper limit value Gc1 of the allowable range of the target center-of-gravity position of a heat generation rate unlike in the routine that is illustrated in FIG. 4.

In a case where it is determined that the center-of-gravity position of a heat generation rate Gc exceeds the upper limit value Gc1 (first crank angle) of the target center-of-gravity position of a heat generation rate (Gc being further on the retard side than Gc1) as a result of the determination in Step 520 (Step 520: Yes), the processing proceeds to Step 440 and the CPU determines whether or not the engine rotational speed Ne is lower than the first rotational speed Ne1 determined in advance as in the routine that is illustrated in FIG. 4.

In a case where it is determined in Step 440 that the engine rotational speed Ne is lower than the first rotational speed Ne1 (Step 440: Yes), the processing proceeds to Step 450 and the CPU determines whether or not the traveling speed (vehicle speed) Spd of the vehicle in which the engine is mounted is lower than the first speed Spd1 determined in advance.

In a case where it is determined in Step 450 that the vehicle speed Spd is lower than the first speed Spd1 (Step 450: Yes), the processing proceeds to Step 460 and the CPU increases the turbocharging pressure of the turbocharger as in the routine illustrated in FIG. 4. In this manner, the second device that executes the routine which is illustrated in FIG.

5 also can control the actual center-of-gravity position of a heat generation rate Gc to be less than the upper limit value Gc1 (first crank angle) of the target center-of-gravity position of a heat generation rate while suppressing an increase in the noise and vibration which the user feels uncomfortable with and ensuring the acceleration performance. The processing proceeds to Step 490 thereafter, and the CPU temporarily terminates this routine.

In a case where it is determined in Step 440 that the engine rotational speed Ne is equal to or higher than the first rotational speed Ne1 (Step 440: No) and in a case where it is determined in Step 450 that the vehicle speed Spd is equal to or higher than the first speed Spd1 (Step 450: No), the center of gravity of a heat generation rate Gc is controlled to be kept within the allowable range of the target center-of-gravity position of a heat generation rate by the use of the injection system parameter as in the routine which is illustrated in FIG. 4. However, the routine that is illustrated in FIG. 5 differs from the routine illustrated in FIG. 4 in that the fuel injection timing and the fuel injection pressure are more scrupulously and properly used depending on the situations of the rotational speed of the engine and the vehicle speed. This point will be described in detail later.

In the routine illustrated in FIG. 5, the processing proceeds to Step 522 and the CPU determines whether or not the center-of-gravity position of a heat generation rate Gc is less than the upper limit value Gc1 of the allowable range of the target center-of-gravity position of a heat generation rate and exceeds a lower limit value Gc2 of the target center-of-gravity position of a heat generation rate (whether or not the center-of-gravity position of a heat generation rate Gc is within the allowable range of the target center-of-gravity position of a heat generation rate), unlike in the routine illustrated in FIG. 4, in a case where it is determined that the center-of-gravity position of a heat generation rate Gc is equal to or less than the upper limit value Gc1 (first crank angle) of the target center-of-gravity position of a heat generation rate (Gc corresponding to Gc1 or being further on the advance side than Gc1) as a result of the determination in Step 520 (Step 520: No).

The desired control results such as the minimization of fuel consumption can be achieved as described above in a case where it is determined in Step 522 that the center-of-gravity position of a heat generation rate Gc is within the allowable range of the target center-of-gravity position of a heat generation rate (Step 522: Yes). Accordingly, in this case, the processing proceeds to Step 490 without the second device changing the setting of the combustion parameter, and then this routine is temporarily terminated. As a result, the center-of-gravity position of heat generation Gc is not changed, and a state where the desired control results are achieved is maintained. In addition, control stabilization can be expected with the occurrence of the hunting of the center-of-gravity position of heat generation Gc suppressed.

A case where it is determined that the center-of-gravity position of a heat generation rate Gc is not within the allowable range of the target center-of-gravity position of a heat generation rate (that is, the center-of-gravity position of a heat generation rate Gc corresponding to the lower limit value Gc2 of the target center-of-gravity position of a heat generation rate or being further on the advance side than Gc2) as a result of the determination in Step 522 (Step 522: No) means that the center-of-gravity position of a heat generation rate is on the advance side to excess. In this case, the processing proceeds to Step 480 and the CPU retards the actual center-of-gravity position of a heat generation rate Gc by executing one or both of a decrease in the fuel injection pressure and the retarding of the fuel injection timing as in the routine that is illustrated in FIG. 4. Then, the processing proceeds to Step 490 and the CPU temporarily terminates this routine. In this manner, the possibility of a reduction in the turbocharging pressure that is attributable to the center-of-gravity position of a heat generation rate being on the advance side to excess and the subsequent reduction in the exhaust gas loss can be reduced.

In the routine that is illustrated in FIG. 5, the fuel injection timing and the fuel injection pressure are more scrupulously and properly used depending on the situations of the rotational speed of the engine and the vehicle speed as described above in a case where it is determined in Step 440 that the engine rotational speed Ne is equal to or higher than the first rotational speed Ne1 (Step 440: No) and in a case where it is determined in Step 450 as described above that the vehicle speed Spd is equal to or higher than the first speed Spd1 (Step 450: No). Specifically, in a case where it is determined in Step 440 that the engine rotational speed Ne is equal to or higher than the first rotational speed Ne1 (Step 440: No), the processing proceeds to Step 530 and the CPU advances the center-of-gravity position of a heat generation rate Gc by executing an increase in the fuel injection pressure. Then, the processing proceeds to Step 490 and the CPU temporarily terminates this routine. In a case where it is determined in Step 450 that the vehicle speed Spd is equal to or higher than the first speed Spd1 (Step 450: No), the processing proceeds to Step 536 and the CPU executes the advancing of the fuel injection timing. Then, the processing proceeds to Step 490 and the CPU temporarily terminates this routine.

As described above, in a case where the center-of-gravity position of a heat generation rate Gc is further on the retard side than the upper limit value Gc1 (first crank angle) of the target center-of-gravity position of a heat generation rate (Step 520: Yes), the second device that executes the routine which is illustrated in FIG. 5 performs the control of the center of gravity of a heat generation rate based on a change in not the fuel injection pressure which has a relatively greater effect on the combustion noise but the fuel injection timing which has a relatively less effect on the combustion noise (Step 536) even when the speed of the vehicle Spd in which the engine is mounted is equal to or higher than the first speed Spd1 insofar as the rotational speed Ne of the engine is lower than the first rotational speed Ne1 (Step 440: Yes and Step 450: No). Accordingly, fuel economy can be improved by the center-of-gravity position of a heat generation rate being maintained at a predetermined fixed value while an increase in the noise and vibration which the user feels uncomfortable with is effectively suppressed.

In a case where the center-of-gravity position of a heat generation rate Gc is further on the retard side than the upper limit value Gc1 (first crank angle) of the target center-of-gravity position of a heat generation rate (Step 520: Yes), the second device controls the center of gravity of a heat generation rate by changing the fuel injection pressure (Step 530), which has a relatively greater effect on the combustion noise, when the rotational speed Ne of the engine is equal to or higher than the first rotational speed Ne1 (Step 440: No). Accordingly, fuel economy can be improved by the center-of-gravity position of a heat generation rate being maintained at a predetermined fixed value while an increase in the noise and vibration which the user feels uncomfortable with is suppressed.

In the engine control device according to the invention, the pattern of properly using the fuel injection timing and the fuel injection pressure as the parameters used for the control of the center of gravity of a heat generation rate in a case where the center-of-gravity position of a heat generation rate is further on the retard side than the upper limit value (first crank angle) of the target center-of-gravity position of a heat generation rate is not limited to the above.

In the operation region where the rotational speed of the engine is high, for example, a high fuel injection pressure is set in some cases as described above. In this situation, there might be little room for a rise in the fuel injection pressure. As a result, it might be difficult to sufficiently advance the center of gravity of a heat generation rate by an increase in the fuel injection pressure alone. In this case, the control of the center of gravity of a heat generation rate based on a change in the fuel injection timing may be additionally performed. In other words, the center-of-gravity position of a heat generation rate may be further advanced based on the advancing of the fuel injection timing in a case where the center-of-gravity position of a heat generation rate advanced by the execution of the increase in the fuel injection pressure by the combustion control unit when the rotational speed of the engine is equal to or higher than the first rotational speed in a case where the center-of-gravity position of a heat generation rate is further on the retard side than the first crank angle as described above still remains further on the retard side than the first crank angle.

In the case of (a) described above, the engine rotational speed is equal to or higher than the first rotational speed and the speed of the vehicle in which the engine is mounted (vehicle speed) is equal to or higher than the first speed. In this case, a situation is assumed in which the levels of the noise and vibration occurring in the engine are high and the levels of the wind noise, the road noise, and the like are also high. In other words, in this case, the change in the noise and vibration resulting from the combustion of the fuel tends to be very unlikely to be sensed by the user. Accordingly, in a case where the speed of the vehicle in which the engine is mounted is high and the rotational speed of the engine is high, any one or both of the fuel injection pressure and the fuel injection timing may be selected as the injection system parameter for the control of the center of gravity of a heat generation rate.

From the point of view of the high level of responsiveness during the correction and the ease of the calculation of the deviation (correction deviation) of the center-of-gravity position of a heat generation rate resulting from the correction, it is desirable that the fuel injection timing is selected as the injection system parameter for the control of the center-of-gravity position of a heat generation rate in a case where the speed of the vehicle in which the engine is mounted is high and the rotational speed of the engine is high. As described above, in the engine control device according to the various aspects of the invention, the combustion control unit can further scrupulously and properly use the fuel injection timing and the fuel injection pressure in various manners as the parameters used for the control of the center of gravity of a heat generation rate depending on, for example, the situations of the rotational speed of the engine and the vehicle speed.

Embodiment 3

Third Embodiment

Figure 6:
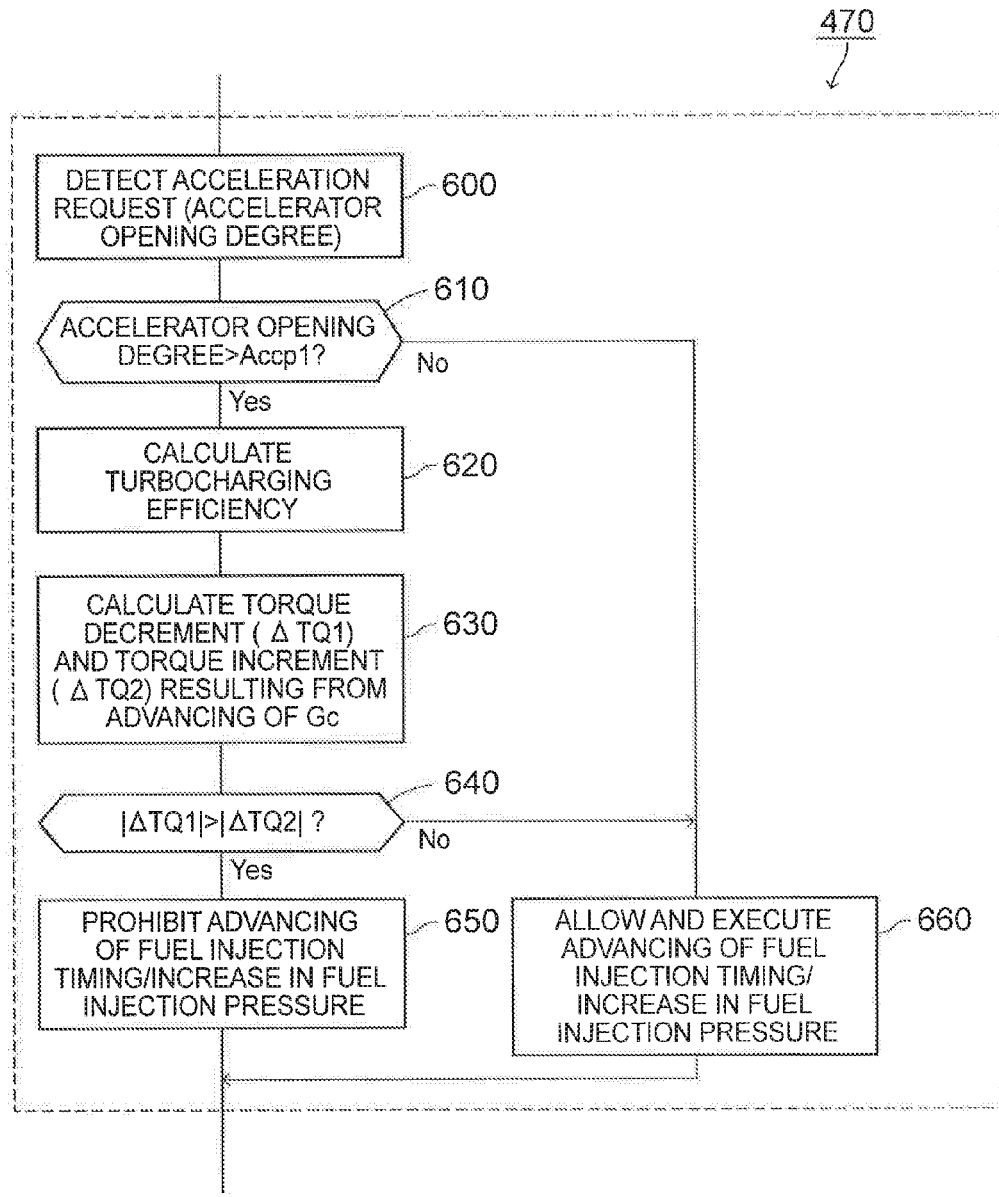
FIG. 6 is a flowchart illustrating a part of the routine that is executed by the CPU of the control device which is illustrated in FIG. 3.
Figure 7A:
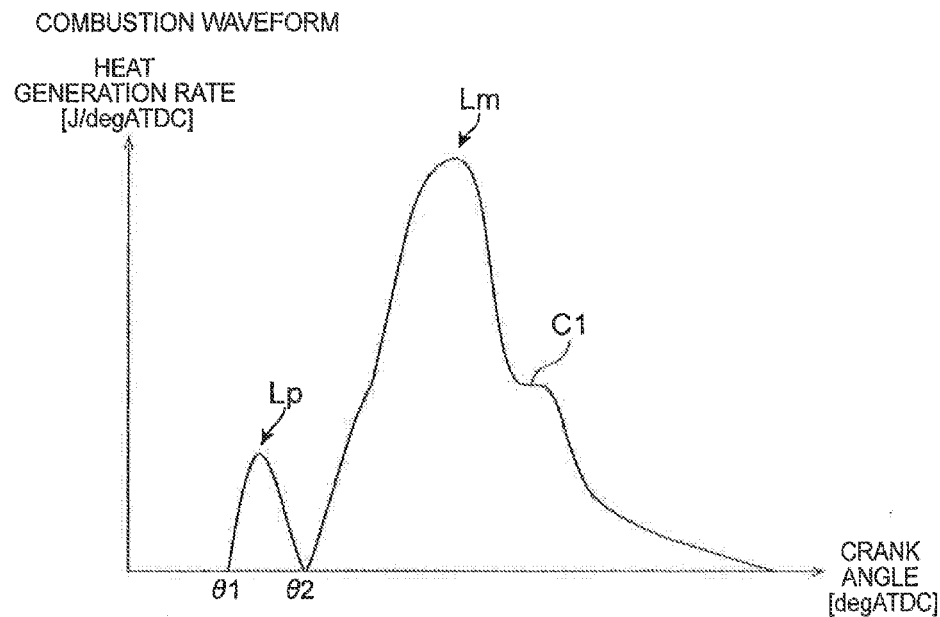
FIG. 7A is a graph showing the combustion waveform.
Figure 7B:
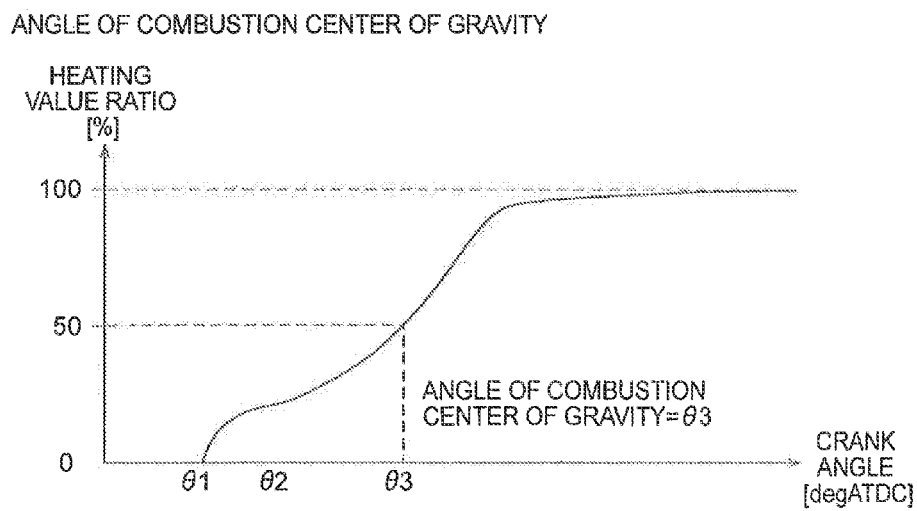
FIG. 7B is a graph for showing the angle of the combustion center of gravity.
Figure 8A:
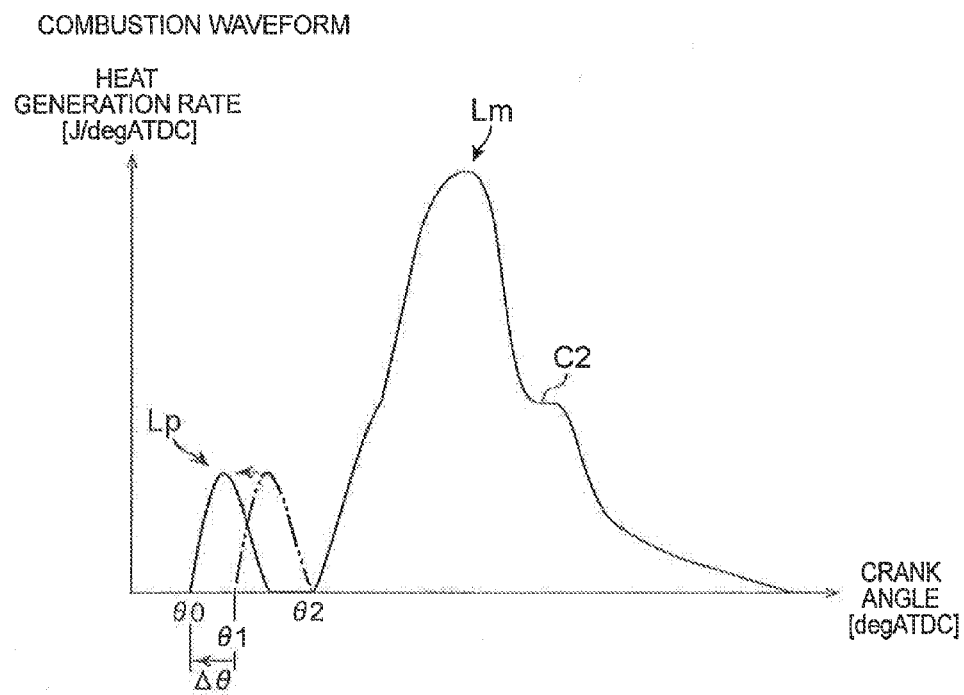
FIG. 8A is a graph showing the combustion waveform.
Figure 8B:
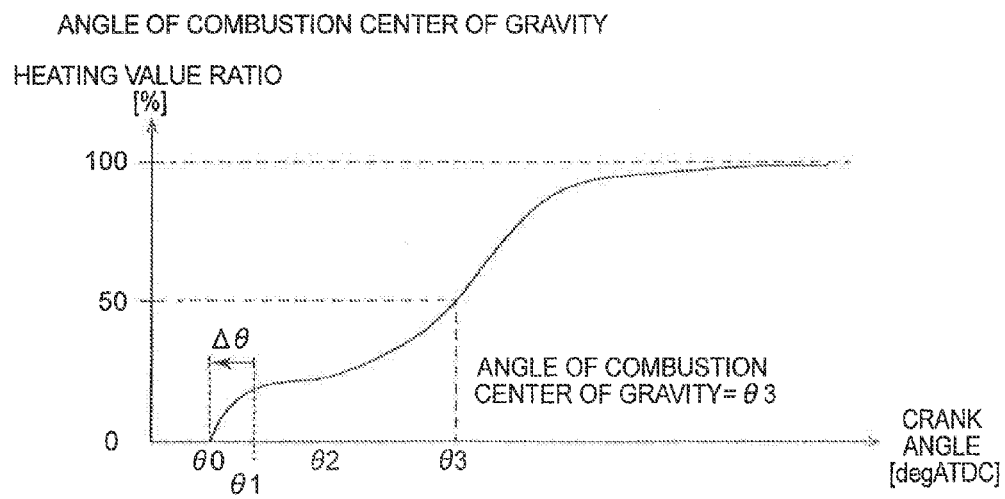
FIG. 8B is a graph for showing the angle of the combustion center of gravity.

An engine control device according to a third embodiment of the invention (hereinafter, also referred to as a "third device") will be described below. The third device differs from the first device only in that the CPU of the electronic control unit 70 of the third device executes the "routine that is illustrated in FIG. 6" instead of "Step 470 in the routine that is illustrated in FIG. 4". The following description will focus on this difference.

As described above, in the routine illustrated in FIG. 4, the processing proceeds to Step 470 and the CPU advances the actual center-of-gravity position of a heat generation rate Gc by executing one or both of an increase in the fuel injection pressure and the advancing of the fuel injection timing in any of cases where it is determined in Step 440 that the engine rotational speed Ne is equal to or higher than the first rotational speed Ne1 (Step 440: No) or where it is determined in Step 450 that the vehicle speed Spd is equal to or higher than the first speed Spd1 (Step 450: No).

When the center-of-gravity position of a heat generation rate is advanced based on the increase in the fuel injection pressure and/or the advancing of the fuel injection timing as described above, however, the exhaust gas loss is reduced due to the increase in the fuel injection pressure and/or the advancing of the fuel injection timing, and then a reduction in the turbocharging pressure might be caused. When the turbocharging pressure is to be compensated for by, for example, a decrease in the opening degree of the nozzle vane and/or the bypass valve of the turbine of the variable capacity-type turbocharger in this case, the pump loss is exacerbated (increases) and both fuel economy and the acceleration performance might be exacerbated as a result thereof.

According to the third device, even when the rotational speed Ne of the engine is equal to or higher than the first rotational speed Ne1 or the speed of the vehicle Spd in which the engine is mounted is equal to or higher than the first speed Spd1 in a case where the center-of-gravity position of a heat generation rate Gc is further on the retard side than the upper limit value Gc1 (first crank angle) of the target center-of-gravity position of a heat generation rate, none of the increase in the fuel injection pressure and the advancing of the fuel injection timing is executed when the accelerator opening degree (Accp) of the engine exceeds a first opening degree Accp1 and the absolute value of an increment ($\Delta$TQ2) in torque attributable to the center-of-gravity position of a heat generation rate Gc approaching the first crank angle Gc1 because of the increase in the fuel injection pressure and/or the advancing of the fuel injection timing is determined to be less than the absolute value of a decrement ($\Delta$TQ1) in torque attributable to an increase in the pump loss of the engine resulting from a compensation for a reduction in the turbocharging pressure resulting from the increase in the fuel injection pressure and/or the advancing of the fuel injection timing.

Specifically, the third device executes the "routine that is illustrated in FIG. 6" instead of "Step 470 in the routine that is illustrated in FIG. 4" when the CPU is to enter the stage of Step 470 in the routine that is illustrated in FIG. 4. Specifically, the accelerator opening degree Accp is detected in Step 600 as an index for a determination on the presence or absence of an acceleration request for the vehicle. Then, the processing proceeds to Step 610, and the CPU determines whether or not the accelerator opening degree Accp exceeds a first opening degree Accp1 (presence or absence of the acceleration request).

In a case where it is determined that the accelerator opening degree Accp does not exceed the first opening degree Accp1 (Accp≤Accp1) as a result of the determination in Step 610 (Step 610: No), the deterioration of the acceleration performance described above does not have to be taken into account, and thus the processing proceeds to Step 660 and the CPU executes one or both of an increase in the fuel injection pressure and the advancing of the fuel injection timing as in Step 470 in the routine illustrated in FIG. 4. In a case where it is determined that the accelerator opening degree Accp exceeds the first opening degree Accp1 (Accp>Accp1) as a result of the determination in Step 610 (Step 610: Yes), the occurrence of the deterioration of the acceleration performance described above should be avoided, and thus the processing proceeds to Step 620 and the CPU calculates the amount of the reduction of the turbocharging pressure resulting from the increase in the fuel injection pressure and/or the advancing of the fuel injection timing (ΔPim) and calculates the amount of a reduction in turbocharging efficiency resulting from a compensation for the calculated ΔPim by, for example, a decrease in the opening degree of the nozzle vane and/or the bypass valve of the turbine of the variable capacity-type turbocharger or the like based on the turbocharging pressure, a turbine inlet pressure, the opening degree of the nozzle vane and/or the bypass valve, the amount of the intake air, or the like.

Then, the processing proceeds to Step 630 and the CPU calculates the decrement in the torque (ΔTQ1) based on the calculated turbocharging efficiency. The increment in the torque (ΔTQ2) resulting from the advancing of the center-of-gravity position of a heat generation rate Gc is calculated based on, for example, the values of various combustion parameters at the new center-of-gravity position of a heat generation rate Gc that is achieved as a result of the increase in the fuel injection pressure and/or the advancing of the fuel injection timing and the operating situations of the engine and the vehicle in which the engine is mounted (such as the engine rotational speed Ne and the vehicle speed Spd).

Then, the processing proceeds to Step 640 and the CPU determines the magnitude relation of the absolute values of the torque decrement (ΔTQ1) and the torque increment (ΔTQ2) calculated as described above. Specifically, in Step 640, it is determined whether or not the absolute value (|ΔTQ1|) of the torque decrement (ΔTQ1) exceeds the absolute value (|ΔTQ2|) of the torque increment (ΔTQ2). In a case where it is determined that the absolute value of the torque increment is equal to or higher than the absolute value of the torque decrement (|ΔTQ1|≤|ΔTQ2|) as a result of the determination in Step 640 (Step 640: No), the deterioration of the acceleration performance described above is less likely to be caused. Accordingly, the processing proceeds to Step 660 and the CPU executes one or both of an increase in the fuel injection pressure and the advancing of the fuel injection timing as in Step 470 in the routine illustrated in FIG. 4. In a case where it is determined that the absolute value of the torque increment is lower than the absolute value of the torque decrement (|ΔTQ1|>|ΔTQ2|) as a result of the determination in Step 640 (Step 640: Yes), the deterioration of the acceleration performance described above is likely to be caused. Accordingly, the CPU prohibits an increase in the fuel injection pressure and the advancing of the fuel injection timing (Step 650). As described above, the third device can improve fuel economy while ensuring the acceleration performance in a case where the acceleration request is present.

Several aspects that have specific configurations have been described with reference to the accompanying drawings for the purpose of the description of the invention. However, the scope of the invention should not be interpreted to be limited to the exemplified aspects. As a matter of course, appropriate modifications can be added to the scope of the invention within the range of the items described in the claims and this specification.

REFERENCE SIGNS LIST

10 . . . ENGINE, 20 . . . ENGINE MAIN BODY PORTION, 21 . . . MAIN BODY, 22 . . . CYLINDER, 23 . . . FUEL INJECTION VALVE, 30 . . . FUEL SUPPLY SYSTEM, 31 . . . FUEL PRESSURE PUMP, 32 . . . FUEL DELIVERY TUBE, 33 . . . COMMON RAIL, 40 . . . INTAKE SYSTEM, 41 . . . INTAKE MANIFOLD, 42 . . . INTAKE PIPE, 43 . . . AIR CLEANER, 44 . . . TURBOCHARGER, 44A . . . COMPRESSOR, 44B . . . TURBINE, 45 . . . INTERCOOLER, 46 . . . THROTTLE VALVE, 47 . . . THROTTLE VALVE ACTUATOR, 50 . . . EXHAUST SYSTEM, 51 . . . EXHAUST MANIFOLD, 52 . . . EXHAUST PIPE, 53 . . . DIESEL OXIDATION CATALYST (DOC), 54 . . . DIESEL PARTICULATE FILTER (DPF), 55 . . . EXHAUST THROTTLE VALVE, 60 . . . HIGH-PRESSURE EGR SYSTEM, 61 . . . HIGH-PRESSURE EXHAUST GAS RECIRCULATION PIPE, 62 . . . HIGH-PRESSURE EGR CONTROL VALVE, 63 . . . HIGH-PRESSURE EGR COOLER, 70 . . . ELECTRONIC CONTROL UNIT (ECU), 71 . . . AIR FLOW METER, 72 . . . THROTTLE VALVE OPENING DEGREE SENSOR, 73 . . . INTAKE PIPE PRESSURE SENSOR, 74 . . . FUEL PRESSURE SENSOR, 75 . . . IN-CYLINDER PRESSURE SENSOR, 76 . . . CRANK ANGLE SENSOR, 77 . . . HIGH-PRESSURE EGR CONTROL VALVE OPENING DEGREE SENSOR, 78 . . . WATER TEMPERATURE SENSOR, 79 . . . LOW-PRESSURE EGR CONTROL VALVE OPENING DEGREE SENSOR, 80 . . . EXHAUST THROTTLE VALVE OPENING DEGREE SENSOR, 90 . . . LOW-PRESSURE EGR SYSTEM, 91 . . . LOW-PRESSURE EXHAUST GAS RECIRCULATION PIPE, 92 . . . LOW-PRESSURE EGR CONTROL VALVE, 93 . . . LOW-PRESSURE EGR COOLER

The invention claimed is:

1. A control device for an internal combustion engine, the internal combustion engine including a turbocharger, the control device comprising:
an electronic control unit configured to set a combustion parameter of the internal combustion engine such that a center-of-gravity position of a heat generation rate of the internal combustion engine corresponds to a first crank angle in a case where a load of the internal combustion engine is within a range between at least a first threshold and a second threshold exceeding the first threshold, the center-of-gravity position of the heat generation rate being a position determined based on the heat generation rate as an amount per unit crank angle of heat generated by combustion of fuel supplied to a cylinder of the internal combustion engine,
wherein the electronic control unit is configured to control the internal combustion engine by increasing a turbocharging pressure of the turbocharger such that the center-of-gravity position of the heat generation rate corresponds to the first crank angle when the center-of-gravity position of the heat generation rate is further on a retard side than the first crank angle, a rotational speed of the internal combustion engine is lower than a first rotational speed, and a speed of a vehicle in which the internal combustion engine is mounted is lower than a first speed, and
wherein the electronic control unit is configured to control the internal combustion engine by executing one or both of an increase in a fuel injection pressure and advancing of a fuel injection timing such that the center-of-gravity position of the heat generation rate corresponds to the first crank angle when the center-of-gravity position of the heat generation rate is further on the retard side than the first crank angle and the rotational speed of the engine is equal to or higher than the first rotational speed or the speed of the vehicle is equal to or higher than the first speed.

2. The control device according to claim 1, wherein the electronic control unit is configured to control the internal combustion engine such that only the advancing of the fuel injection timing is executed when the center-of-gravity position of the heat generation rate is further on the retard side than the first crank angle, the speed of the vehicle is equal to or higher than the first speed, and the rotational speed of the internal combustion engine is lower than the first rotational speed, and the electronic control unit is configured to control the internal combustion engine such that the increase in the fuel injection pressure is executed when the center-of-gravity position of the heat generation rate is further on the retard side than the first crank angle, the speed of the vehicle is equal to or higher than the first speed, and the rotational speed of the internal combustion engine is equal to or higher than the first rotational speed.

3. The engine control device according to claim 1, wherein the electronic control unit is configured to control the internal combustion engine such that the increase in the fuel injection pressure or the advancing of the fuel injection timing is not executed, even when the center-of-gravity position of the heat generation rate is further on the retard side than the first crank angle and the rotational speed of the internal combustion engine is equal to or higher than the first rotational speed or the speed of the vehicle is equal to or higher than the first speed, in a case where a stop condition is satisfied, the stop condition being a condition that an accelerator opening degree of the engine exceeds a first opening degree and an absolute value of an increment in torque attributable to the center-of-gravity position of the heat generation rate approaching the first crank angle because of the increase in the fuel injection pressure or the advancing of the fuel injection timing is less than an absolute value of a decrement in torque attributable to an increase in pump loss of the engine resulting from a compensation for a reduction in the turbocharging pressure resulting from the increase in the fuel injection pressure or the advancing of the fuel injection timing.

4. The engine control device according to claim 1, wherein the electronic control unit is configured to control the internal combustion engine such that one or both of a decrease in the fuel injection pressure and retarding of the fuel injection timing are executed in a case where the center-of-gravity position of the heat generation rate is further on an advance side than a second crank angle set further on the advance side than the first crank angle, and the electronic control unit is configured to control the internal combustion engine such that none of the turbocharging pressure of the turbocharger, the fuel injection pressure, and the fuel injection timing is changed in a case where the center-of-gravity position of the heat generation rate is further on the advance side than the first crank angle and is further on the retard side than the second crank angle.

5. The control device according to claim 1, wherein the electronic control unit is configured to calculate the center-of-gravity position of the heat generation rate as a crank angle corresponding to a geometric center of gravity of a region surrounded by a waveform of the heat generation rate drawn in a graph in which a crank angle of a single combustion stroke is set on one axis and the heat generation rate is set on the other axis orthogonal to the one axis and the one axis.

6. The engine control device according to claim 1, wherein the electronic control unit is configured to calculate the center-of-gravity position of the heat generation rate as a specific crank angle at which areas of two regions divided from each other by the specific crank angle are equal to each other when a region surrounded by a waveform of the heat generation rate drawn in a graph in which a crank angle of a single combustion stroke is set on one axis and the heat generation rate is set on the other axis orthogonal to the one axis and the one axis is divided by the specific crank angle.

7. The engine control device according claim 1, wherein the electronic control unit is configured to calculate the center-of-gravity position of the heat generation rate as a specific crank angle at which a value obtained by integrating, with respect to crank angle, a product of a crank angle difference between any crank angle on an advanced angle side from a specific crank angle and the specific crank angle, and the heat release rate at the any crank angle is equal to a value obtained by integrating, with respect to crank angle, a product of a crank angle difference between any crank angle on the retarded angle side from the specific crank angle and the specific crank angle, and the heat release rate at the any crank angle.

8. The engine control device according, claim 1 wherein the electronic control unit is configured to calculate the center-of-gravity position of the heat generation rate as a specific crank angle between combustion initiation and combustion termination of a single combustion stroke at which a value obtained by integrating a value corresponding to a product of a value obtained by subtracting the specific crank angle from an arbitrary crank angle and the heat generation rate at the arbitrary crank angle with respect to a crank angle from the combustion initiation to the combustion termination becomes "0".

9. The engine control device according to claim 1, wherein the electronic control unit is configured to calculate the center-of-gravity position of the heat generation rate as a value obtained by adding a combustion initiation crank angle to a value obtained by dividing an integral value of a product of a value obtained by subtracting the combustion initiation crank angle from an arbitrary crank angle of a single combustion stroke and the heat generation rate at the arbitrary crank angle by an area of a region defined by a waveform of the heat generation rate with respect to a crank angle.

10. The engine control device according to claim 1, wherein
the electronic control unit is configured to calculate the center-of-gravity position of the heat generation rate as a crank angle obtained by a calculation based on a following equation, $$Gc = \frac{\int_{CAs}^{CAe} (\theta - CAs) \, dQ(\theta) d\theta}{\int_{CAs}^{CAe} dQ(\theta) d\theta} + CAs \quad (3)$$

in the equation, Gc is the center-of-gravity position of the heat generation rate, CAs is a combustion initiation crank angle as a crank angle at which the combustion of the fuel begins, CAe is a combustion termination crank angle as a crank angle at which the combustion terminates, $\theta$ is an arbitrary crank angle, and $dQ(\theta)$ is the heat generation rate at the crank angle $\theta$.

* * * * *